US010550937B2

(12) United States Patent
Waku et al.

(10) Patent No.: US 10,550,937 B2
(45) Date of Patent: Feb. 4, 2020

(54) GEAR SHIFT CONTROL DEVICE FOR VEHICLE TRANSMISSION AND GEAR SHIFT CONTROL METHOD FOR VEHICLE TRANSMISSION

(71) Applicant: JATCO Ltd, Fuji-shi, Shizuoka (JP)

(72) Inventors: Kousuke Waku, Hadano (JP); Incheol Na, Seoul (KR); Mamiko Inoue, Isehara (JP)

(73) Assignee: JATCO LTD, Fuji-Shi (JP)

(*) Notice: Subject to any disclaimer, the term of this patent is extended or adjusted under 35 U.S.C. 154(b) by 11 days.

(21) Appl. No.: 16/069,737

(22) PCT Filed: Jan. 10, 2017

(86) PCT No.: PCT/JP2017/000385
§ 371 (c)(1),
(2) Date: Jul. 12, 2018

(87) PCT Pub. No.: WO2017/122603
PCT Pub. Date: Jul. 20, 2017

(65) Prior Publication Data
US 2019/0024791 A1 Jan. 24, 2019

(30) Foreign Application Priority Data

Jan. 15, 2016 (JP) .................................. 2016-006532

(51) Int. Cl.
*F16H 61/662* (2006.01)
*F16H 61/70* (2006.01)
(Continued)

(52) U.S. Cl.
CPC ....... *F16H 61/66259* (2013.01); *F16H 59/20* (2013.01); *F16H 59/44* (2013.01);
(Continued)

(58) Field of Classification Search
CPC ......... F16H 2059/186; F16H 2059/366; F16H 2061/6605; F16H 2061/0496;
(Continued)

(56) References Cited

U.S. PATENT DOCUMENTS 5,005,442 A 4/1991 Sakakibara et al.
7,130,734 B2 * 10/2006 Sah ........................ B60K 6/387
701/67

(Continued)

FOREIGN PATENT DOCUMENTS

JP  H01-176851 A  7/1989
JP  H05-079554 A  3/1993
(Continued)

*Primary Examiner* — Erin D Bishop
(74) *Attorney, Agent, or Firm* — Foley & Lardner LLP

(57) ABSTRACT

In gear-shift control apparatus and method for a vehicular transmission, a variator which is interposed between an engine and driving wheels and which is capable of modifying a gear (speed) ratio continuously; a sub transmission which is installed in series with the variator and which is capable of switching a plurality of gear-shift stages through a replacement of engagement elements; and a transmission controller which performs a gear ratio control for the variator and a gear-shift stage control for the sub transmission are installed. During a deceleration through a second speed stage of the sub transmission, when the variator is a state in which the variator is at a lowest gear (speed) ratio, a down-shift in which the sub transmission is forced to perform the gear-shift from a second speed stage to a first speed stage, with the variator maintained at the lowest gear (speed) ratio.

8 Claims, 11 Drawing Sheets

(51) Int. Cl.
*F16H 59/20* (2006.01)
*F16H 59/44* (2006.01)
*F16H 61/02* (2006.01)
*F16H 63/50* (2006.01)
F16H 61/66 (2006.01)
F16H 59/14 (2006.01)
F16H 59/18 (2006.01)
F16H 59/36 (2006.01)
F16H 61/04 (2006.01)

(52) U.S. Cl.
CPC ......... *F16H 61/0213* (2013.01); *F16H 61/70* (2013.01); *F16H 63/502* (2013.01); F16H 2059/147 (2013.01); F16H 2059/186 (2013.01); F16H 2059/363 (2013.01); F16H 2059/366 (2013.01); F16H 2059/446 (2013.01); F16H 2061/023 (2013.01); F16H 2061/0496 (2013.01); F16H 2061/6605 (2013.01); F16H 2061/66218 (2013.01)

(58) Field of Classification Search
CPC ......... F16H 61/66254; F16H 61/66259; F16H 61/662; F16H 61/70; F16H 63/502
See application file for complete search history.

(56) References Cited

U.S. PATENT DOCUMENTS

| | | | |
|---|---|---|---|
| 7,294,092 B2* | 11/2007 | Walker | B60W 10/11 477/107 |
| 8,771,142 B2* | 7/2014 | Watanabe | B60W 30/18072 477/54 |
| 2003/0022758 A1 | 1/2003 | Watanabe et al. | |

FOREIGN PATENT DOCUMENTS

| | | |
|---|---|---|
| JP | H08-326883 A | 12/1996 |
| JP | 2003-041971 A | 2/2003 |
| JP | 2005-164046 A | 6/2005 |

* cited by examiner

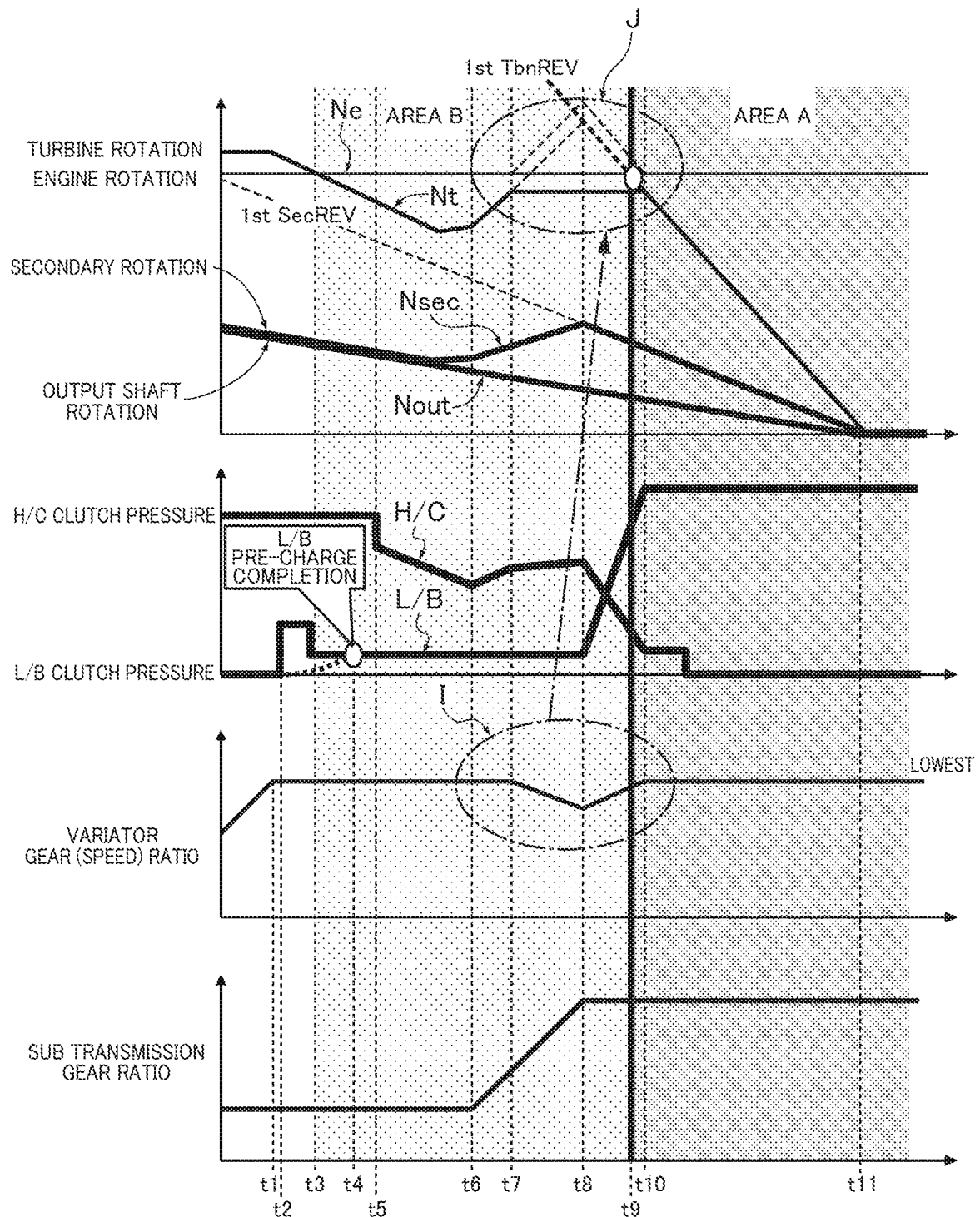

GEAR SHIFT CONTROL DEVICE FOR VEHICLE TRANSMISSION AND GEAR SHIFT CONTROL METHOD FOR VEHICLE TRANSMISSION

TECHNICAL FIELD

The present invention relates to a gear-shift control apparatus for a vehicular transmission and a gear-shift control method for the vehicular transmission, the transmission including a variator capable of modifying a gear (speed) ratio at an unlimited stage (or continuously) and a stepwise (stepped) sub transmission installed in series with the variator.

BACKGROUND ART

Conventionally, a gear shift control apparatus for a vehicular transmission equipped with a sub transmission is known which performs a synchronization gear-shift such that a speed (gear) ratio of the variator to meet with the gear ratio of the sub transmission so that a whole gear ratio of a whole of the transmission is met with a target value (the gear ratio of the whole of the transmission is hereinafter called a through gear ratio) during a time at which a gear-shift request (demand) occurs (for example, refer to a Patent Document 1).

Incidentally, it is considered that, during a vehicular stop, a 2-1 speed gear-shift is carried out without carrying out a gear-shift (so-called, 2-1 (speed) gear-shift) of the sub transmission from a 2-nd speed gear stage to a 1-st speed gear stage during a vehicular deceleration. The reasons of the above-described not carrying out the gear-shift during the deceleration are two points as will be described below.

That is, as a first point, an avoidance of a shock occurring during the traveling in association with the gear-shift (a clutch-clutch replacement gear shift).

As a second point, the avoidance of the variator from not being returned to a lowest gear ratio (the variator is up-shifted due to the synchronization gear-shift in association with the 2-1 speed gear-shift of the sub transmission). The variator is down-shifted toward the lowest gear ratio when the 2-1 speed gear-shift of the sub transmission is ended. For example, during an abrupt deceleration, the vehicle is often stopped without the completion of the gear-shift to the lowest gear ratio.)

In this way, in the transmission having the variator and the sub transmission disposed in series with the variator, the structure in which the sub transmission carries out the 2-1 speed gear-shift when the vehicle is started in the stopped state brings such a problem as will be described below. That is, in a case where a time duration during the vehicular stopped state is short, there is a possibility that a driving force is insufficient when the vehicle is started.

That is, at a timing at which the vehicle is stopped, the vehicle is swung in a forward-and-backward direction due to a swing back of the vehicle. Even when a vehicle speed indicates zero, the vehicle is not determined to be stopped (but is determined to be stopped after a passage of a determination time from zero vehicle speed). Hence, the 2-1 speed gear-shift of the sub transmission is not started. When the vehicle is tried to be started in this state, the sub transmission is left at the 2-nd speed, the driving force of the 1-st speed cannot be obtained so that, when the vehicle is started, there is a probability of being insufficient driving force. For example, this is easy to occur when a vehicle driver stops the vehicle at an entrance of a high-way road.

Specifically, the vehicle driver decelerates the vehicle in order to receive a traffic ticket with the vehicle stopped in front of a ticketing machine and then often starts the vehicle. In this case, although the vehicle speed is temporarily zeroed, in a stop determination, the determination that the vehicle is stopped is not made and the sub transmission is left at 2-nd speed (stage). It can be thought that the sub transmission is forced to perform the 2-1 speed gear-shift on a basis of the vehicle start request. However, during the gear-shift, a 1-st speed driving force cannot be obtained and it is unavoidable that the driving force is insufficient when the vehicle is started.

PRE-PUBLISHED DOCUMENT

Patent Document 1: a Japanese Patent Application Laid-open first Publication No. H05-79554

DISCLOSURE OF THE INVENTION

It is, with the above-described problem in mind, an object of the present invention to provide a gear-shift control apparatus for a vehicular transmission and a gear-shift control method for the same which achieve an improvement in a response characteristic of a driving force when the vehicle is started from a deceleration state.

To achieve the above-described object, according to the gear-shift control apparatus for the vehicular transmission and the gear-shift control method for the same, a variator, a sub transmission, and a gear-shift control section are equipped. The variator is intervened between a traveling purpose drive source and driving wheels and is capable of modifying a gear ratio continuously. The sub transmission installed in series with the variator and is capable of switching a plurality of gear-shift stages by performing a replacement gear shift such that, from among a plurality of engagement elements, one engagement element that has been engaged is released and another engagement element that has been released is engaged. The gear-shift control section is configured to perform a gear ratio control for the variator and a gear-shift stage control for the sub transmission. The gear-shift control section starts a down-shift in which the sub transmission is gear-shifted from a traveling gear-shift stage to a gear-shift stage whose gear ratio is larger than that of another gear-shift stage with the variator maintained at a lowest gear ratio, in a state in which the variator is at the lowest gear ratio during a deceleration with the sub transmission at the traveling gear-shift stage.

Hence, during a deceleration through the traveling gear-shift stage of the sub transmission, if the variator is in a state in which the variator is at the lowest gear (speed) ratio, a down-shift in which the sub transmission is gear-shifted from the traveling gear-shift stage to another gear-shift stage whose gear ratio is larger than that of the traveling gear-shift stage with the variator maintained at the low gear (speed) ratio is started. That is, during the deceleration through the traveling gear-shift stage, the vehicle speed is decreased and a state in which the variator is at the lowest gear (speed) ratio occurs. Thereafter, it is predicted that the vehicle is stopped. Thus, before the vehicle is stopped, the down-shift in which the sub transmission is gear-shifted from the traveling gear-shift stage to another gear-shift stage whose gear ratio is larger than the traveling gear-shift stage is started. In this way, the down-shift toward the other gear-shift stage is ended when the vehicle is stopped. The sub transmission is in the lower side gear-shift stage at this time. When the vehicle is started, the driving force through the lower side gear-shift stage can be obtained. In addition, even if the down-shift to the lower side gear-shift stage is not completed when the vehicle is stopped, a time to the obtaining of the driving force at the lower side gear-shift becomes short as compared with a case where the down-shift to the lowest gear ratio is started after the vehicle stop and a response characteristic of the driving force at the time of the vehicular start can be improved. At this time, since the variator is left at the lowest gear (speed) ratio, the driving force through the variator is not reduced.

BRIEF DESCRIPTION OF THE DRAWINGS

FIG. 14 is a timing chart representing each characteristic of engine rotation speed Ne, turbine rotation speed Nt, secondary rotation speed Nsec, output rotation speed Nout, L/B clutch pressure command, H/C clutch pressure command, the variator gear ratio (speed ratio), and the sub transmission gear ratio in the second preferred embodiment starting the 2-1 speed gear-shift for vehicle speed VSP to enter vehicle speed area B, in the moderate deceleration scene.

EMBODIMENTS FOR CARRYING OUT THE INVENTION

Hereinafter, preferred embodiments for carrying out a gear-shift control apparatus for a vehicular transmission and a gear-shift control method for the same will be described on a basis of a first preferred embodiment and a second preferred embodiment shown in accompanied drawings.

Embodiment 1

First, a structure will be explained.

The gear-shift control apparatus for the vehicular transmission and the gear-shift control method for the same are applied to engine mounted vehicles in each of which a continuously variable transmission with a sub transmission is mounted. The gear-shift control apparatus for the vehicular transmission and gear-shift control method for the same in the first embodiment will be explained by dividing the structure thereof into "a whole system configuration ", "a gear-shift control structure according to a gear-shift map ", and "a coast down-shift control process structure ".

[A Whole System Configuration]

Figure 1:
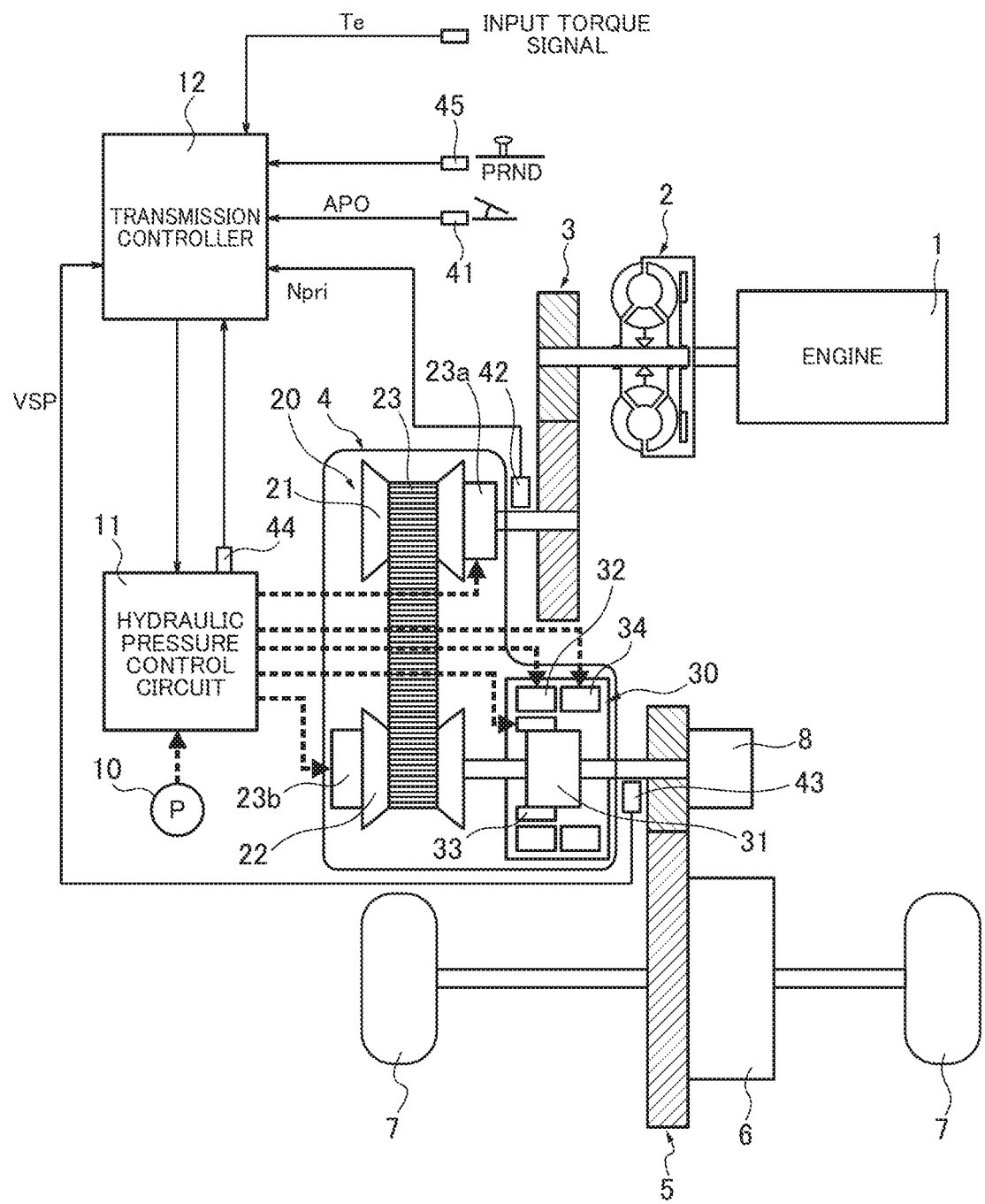
FIG. 1 is a whole structural view of an engine mounted vehicle in which a vehicular transmission to which a gear-shift control apparatus for the vehicular transmission or a gear-shift control method for the same in a first preferred embodiment is applicable.
Figure 2:
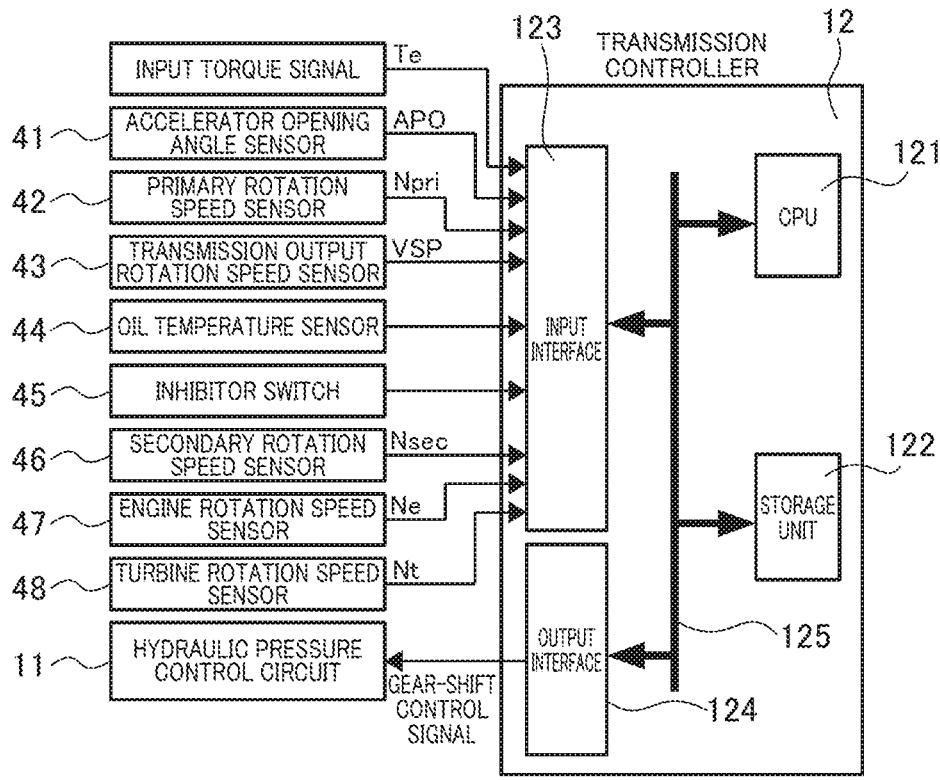
FIG. 2 is a block diagram representing an electronic control system of the vehicular transmission to which the gear-shift control apparatus for the vehicular transmission or the gear-shift control method for the same in the first preferred embodiment is applicable.

FIG. 1 shows a whole structure of an engine mounted vehicle in which a vehicular transmission 4 to which the gear-shift control apparatus in the first preferred embodiment or the gear-shift control method in the first preferred embodiment is applied and FIG. 2 shows an electronic control system of a gear-shift controller. Hereinafter, the whole system configuration of the gear-shift control apparatus and the gear-shift control method will be explained on a basis of FIGS. 1 and 2.

A vehicle in which vehicular transmission 4 in the first preferred embodiment is mounted includes an engine 1 as a traveling purpose drive source. An output rotation from engine 1 is transmitted to driving wheels 7, 7 via a torque converter 2 having a lock-up clutch, a first gear train 3, a vehicular transmission 4, a second gear train 5, and a final differential unit 6. A parking mechanism 8 which locks a mechanically rotation incapably an output shaft of vehicular transmission 4 during the parking is installed in first gear train 5. In addition, the vehicle includes: an oil pump 10 utilizing a part of dynamic power of engine 1 and driven thereby; a hydraulic pressure control circuit 11 regulating a hydraulic pressure from oil pump 10 and supplying each position of vehicular transmission 4; and a transmission controller 12 controlling hydraulic pressure control circuit 11. Hereinafter, each structure will be explained.

Above-described vehicular transmission 4 includes a variator 20 (a continuously variable transmission mechanism) and a sub transmission 30 (a stepped (or stepwise) transmission mechanism) installed in series with variator 20 and is called a continuously variable transmission with the sub transmission. It should, herein, be noted that "installed in series with" has the meaning that, in the same dynamic power transmission path, variator 20 and sub transmission 30 are serially installed. An input shaft of sub transmission 30 may directly be connected to the output shaft of variator 20 as in a case of the output shaft of variator 20 or alternatively may be connected together via another gear-shift mechanism or a dynamic power transmission mechanism (for example, a gear train or clutch(es)). In addition, the input shaft of variator 20 may be connected with the output shaft of sub transmission 30.

Above-described variator 20 is a belt type continuously variable transmission mechanism including: a primary pulley 21; a secondary pulley 22; and a V belt 23 wound around the pulleys 21, 22. Each of both pulleys 21, 22 includes a stationary conical plate, a movable conical plate arranged in a state where a sheave surface is opposed to this stationary conical plate and forming a V groove between the movable conical plate and the stationary conical plate, and a hydraulic pressure cylinder 23a or 23b provided in a back surface of the movable conical plate and displaces the movable conical plate and the movable conical plate in an axial direction. When an oil pressure which is supplied to hydraulic cylinder 23a or 23b is adjusted, a width of the V groove changes and a contact radius of each of the pulleys 21, 22 changes, and then a speed ratio (gear ratio) of variator 20 continuously (in an unlimited stage) changes.

Above-described sub transmission 30 is a forward two speed stages (2 speed) and one reverse speed stage (1 reverse) stepped transmission mechanism. This sub transmission 30 includes a Ravigneaux planetary gear mechanism 31 in which carriers of two planetary gears are coupled and a plurality of frictional engagement elements (a Low brake 32 (abbreviated as L/B), a high clutch 33 (abbreviated as H/C), and a reverse brake 34 (abbreviated as R/B) which are connected to a plurality of rotational elements constituting the Ravigneaux planetary gear mechanism 31 and which change a coupling state of these elements are disposed. When the supplied hydraulic pressure to each of the frictional engagement elements 32, 33, 34 is adjusted and such a replacement gear shift as changing the engagement/release state of each of the frictional engagement elements 22, 23, 24 is carried out, the gear-shift stage of sub transmission 30 is modified.

That is, when low brake 32 which has been releases is engaged and high clutch 33 and reverse brake 34 which have been engaged are released, the gear-shift stage of sub transmission 30 provides a first speed stage (1st speed stage, a vehicle starting gear-shift stage) of sub transmission 30. When high clutch 33 which has been released is engaged and low brake 32 and reverse clutch 34 which have been engaged are released, the gear-shift stage of sub transmission 30 provides a second speed stage (2nd speed) (a traveling gear-shift stage) whose gear ratio is smaller than a first speed (1st speed) gear-shift stage.

In addition, when reverse brake 34 which has been released is engaged and low-brake 32 and high-clutch 33 which have been engaged are released, the gear-shift stage of sub transmission 30 provides a reverse gear-shift stage. It should, herein, be noted that the state in which sub transmission 30 provides the first speed stage is called "a low speed mode" and the state in which sub transmission 30 provides the second speed stage is called "a high speed mode".

Above-described transmission controller 12 (a gear-shift control section) is, as shown in FIG. 2, constituted by CPU 121, a storage unit including a RAM and a ROM, an input interface 123, and an output interface 124, and a bus 125 interconnecting these units.

Above-described input interface 123 receives an output signal of an accelerator opening angle sensor 41 detecting an accelerator opening angle APO, an output signal of accelerator opening angle sensor 41 detecting an accelerator opening angle APO, an output signal of primary rotational speed Npri of variator 20 (an input rotation speed of variator 20) and an output signal of a transmission output rotation speed sensor 43 of transmission output rotational sensor Nout of sub transmission 30. Furthermore, this input interface 123 receives an output signal of an oil temperature sensor 44 detecting ATF oil temperature of vehicular transmission 4, an output signal of an inhibitor switch 45 detecting a position of a select lever, and an input torque signal Te which is a signal of an output torque of engine 1. In addition, input interface 123 receives an output signal of a secondary rotation speed sensor Ne detecting a secondary rotation speed Nsec (an output rotation speed of variator 20) of variator 20, an output signal of an engine rotation speed Ne of engine 1, an output signal of a turbine rotation speed sensor 48 detecting a turbine rotation speed Nt (an input rotation speed of vehicular transmission 4), and so forth.

Above-described storage unit 122 stores a gear-shift control program of vehicular transmission 4 and a gear-shift map (refer to FIG. 3) used in this gear-shift control program. CPU 121 reads and executes the gear-shift control program stored in storage unit 122, generates a gear-shift control signal by carrying out various kinds of signals for the various types of signals inputted via input interface 123, and outputs the generated gear-shift control signal to a hydraulic pressure control circuit 11 via an output interface 124. It should be noted that various types of values used for CPU 121 in arithmetic operation processes and results of calculation (arithmetic operations) are appropriately stored in storage unit 122.

Above-described hydraulic pressure control circuit 11 is constituted by a plurality of flow passages and a plurality of hydraulic pressure control valves. Hydraulic pressure control circuit 11 controls the plurality of hydraulic pressure control valves on a basis of the gear-shift control signal from transmission controller 12 to switch a hydraulic pressure supply passage and regulates a required hydraulic pressure generated in oil pump 10, and supplies the required hydraulic pressure to each position of vehicular transmission 4. Thus, the speed ratio (gear ratio) of variator 20 and the gear-shift (speed) stage of sub transmission 30 are modified and the gear-shift of vehicular transmission 4 is carried out.

[A Gear-shift Control Structure Through the Gear-shift Map]

Figure 3:
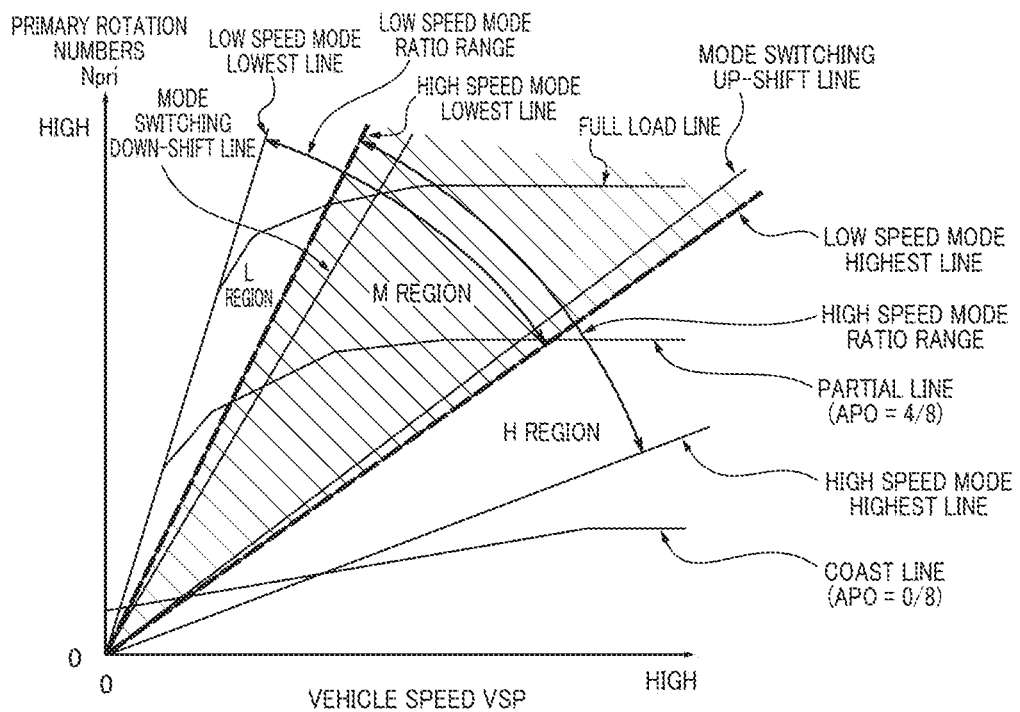
FIG. 3 is a gear-shift map view representing one example of a gear-shift map stored in a storage device of a transmission controller in the first embodiment.

FIG. 3 shows one example of the gear-shift map stored in storage unit 122 of transmission controller 12. Hereinafter, the gear-shift control structure through the gear-shift map will be explained on a basis of FIG. 3.

An operation point of vehicular transmission 4 is determined on a basis of vehicle speed VSP and primary rotational speed Npri on the shift map shown in FIG. 3. A gradient of a line connecting the operation point of vehicular transmission 4 and a zero point located at a left lower corner of the shift map represents a transmission gear ratio of vehicular transmission 4 (a total gear ratio obtained by a multiplication of the gear ratio of sub transmission 30 to the speed ratio of variator 20, namely, a whole gear ratio of vehicular transmission 4 achieved by variator 20 and sub transmission 30. Hereinafter, this ratio is hereinafter called "a through gear ratio". In this map, in the same way as the conventional shift map of the belt type continuously variable transmission, gear-shift lines are set for each accelerator opening angle APO and the gear-shift of vehicular transmission 4 is carried out in accordance with the gear-shift line according to accelerator opening angle APO.

That is, transmission controller 12 refers to the shift map and sets the through gear ratio corresponding to vehicle speed VSP and accelerator opening angle APO (driving point or operation point) as a "target through gear ratio ". This target through gear ratio is a target value which vehicular transmission 4 is finally to reach in a corresponding driving state. Then, transmission controller 12 sets the target through gear ratio which is to follow the target through gear ratio at the desired response characteristic, controls variator 20 and sub transmission 30 so as to carry out a "synchronization gear-shift control " that an actual through gear ratio is made coincident with (to follow) the target through gear ratio.

It should be noted that, in a case where the "synchronization gear shift " is carried out, first, transmission controller 12 calculates a target sub transmission gear ratio at sub transmission 30. It should, herein, be noted that, in a case where no gear-shift is carried out in sub transmission 30, the target sub transmission gear ratio provides the gear ratio achieved at the first speed stage or the gear ratio achieved at the second speed ratio. In addition, in a case where the gear shift is carried out at sub transmission 30, transmission controller 12 calculates the target sub transmission gear ratio from calculated values thereof by calculating the input rotation speed and output rotation speed Nout in accordance with an advance state of the gear-shift of sub transmission 30.

Then, transmission controller 12 calculates the target sub transmission gear ratio and divides the target through gear ratio with the calculated target sub transmission ratio and sets this divided value to the a target speed ratio of variator 20 (hereinafter called, a target variator speed (gear) ratio so as to perform the gear-shift control of variator 20 which makes coincident with (follow) the target variator speed (gear) ratio. Consequently, the target variator speed (gear) ratio is controlled in accordance with the target sub transmission gear ratio so as to make the through gear ratio follow the target value.

In addition, for simplicity purpose in FIG. 3, only a full load line (a shift line when accelerator opening angle APO=8/8), a partial line (a shift line when accelerator opening angle APO=4/8), and a coast line (a shift line when accelerator opening angle APO=0) are depicted.

Then, when vehicular transmission 4 is at a low speed mode, the gear-shift of this vehicular transmission 4 can be carried out between a low-speed mode lowest line obtained by maximizing the gear (speed) ratio of variator 20 and a low-speed mode highest line obtained by minimizing the gear (speed) ratio of variator 20. At this time, the operation point of vehicular transmission 4 moves within an L region and an M region. On the other hand, when vehicular transmission 4 is at a high-speed mode, the gear-shift can be carried out between a high-speed mode lowest line obtained by maximizing the gear (speed) ratio of variator 20 and a high-speed mode highest line obtained by minimizing the gear-shift (speed) ratio mode. At this time, the operation point of vehicular transmission 4 is moved within M region and H region.

It should be noted that the "L region " is an area enclosed by the low-speed mode lowest line and the high-speed lowest line and the "H region" is an area enclosed by the high-speed lowest line and the low-speed highest line. The "H region " is a region enclosed by the low-speed mode highest line and the high-speed mode highest line.

It should also be noted that the gear ratio of each gear-shift stage of sub transmission 30 is set in such a way that the gear ratio corresponding to the low-speed mode highest line (the low-speed mode highest gear ratio) is smaller than the gear ratio corresponding to the high-speed mode lowest line (the high-speed mode lowest gear ratio) (high-speed mode lowest gear ratio). Thus, a low-speed mode ratio range which is a range of the through gear ratio of vehicular transmission 4 which can be taken in the low-speed mode is partially overlapped on a high-speed mode ratio range which is a range of the through gear ratio of vehicular transmission 4 which can be taken in the high-speed mode.

It should, furthermore, be noted that, on the shift map, a mode switching up-shift line (first-speed→second-speed up-shift line of sub transmission 30) which performs an up-shift of sub transmission 30 is set at a position which provides a lower side gear ratio (a large gear ratio) than low-speed mode highest line. In addition, on the shift map, a mode switching down-shift line (a 1-st speed to 2-nd speed down-shift line of sub transmission 30) is set at a position at which a higher side gear ratio (a smaller gear ratio) than the high-speed mode lowest line.

When the operation point of vehicular transmission 4 crosses a mode switching up-shift line or a mode switching down-shift line, namely, in a case where the target through gear ratio of vehicular transmission 4 is varied crossing one of mode switching gear ratios or is made coincident with one of the mode switching gear ratios, transmission controller 12 performs a mode switching gear ratio control. In a case where the "synchronization gear shift " is performed during the mode switching gear ratio control, transmission controller 12 controls the gear-shift control of variator 20 in accordance with the target gear (speed) ratio of variator 20 so that the actual through gear ratio follows the target through gear ratio (target value). Specifically, transmission controller 12 sets the gear (speed) ratio of variator 20 to a value which is a division of the target through gear ratio by the gear ratio of sub transmission 30.

[Coast Down-shift Control Process Structure]

Figure 4:
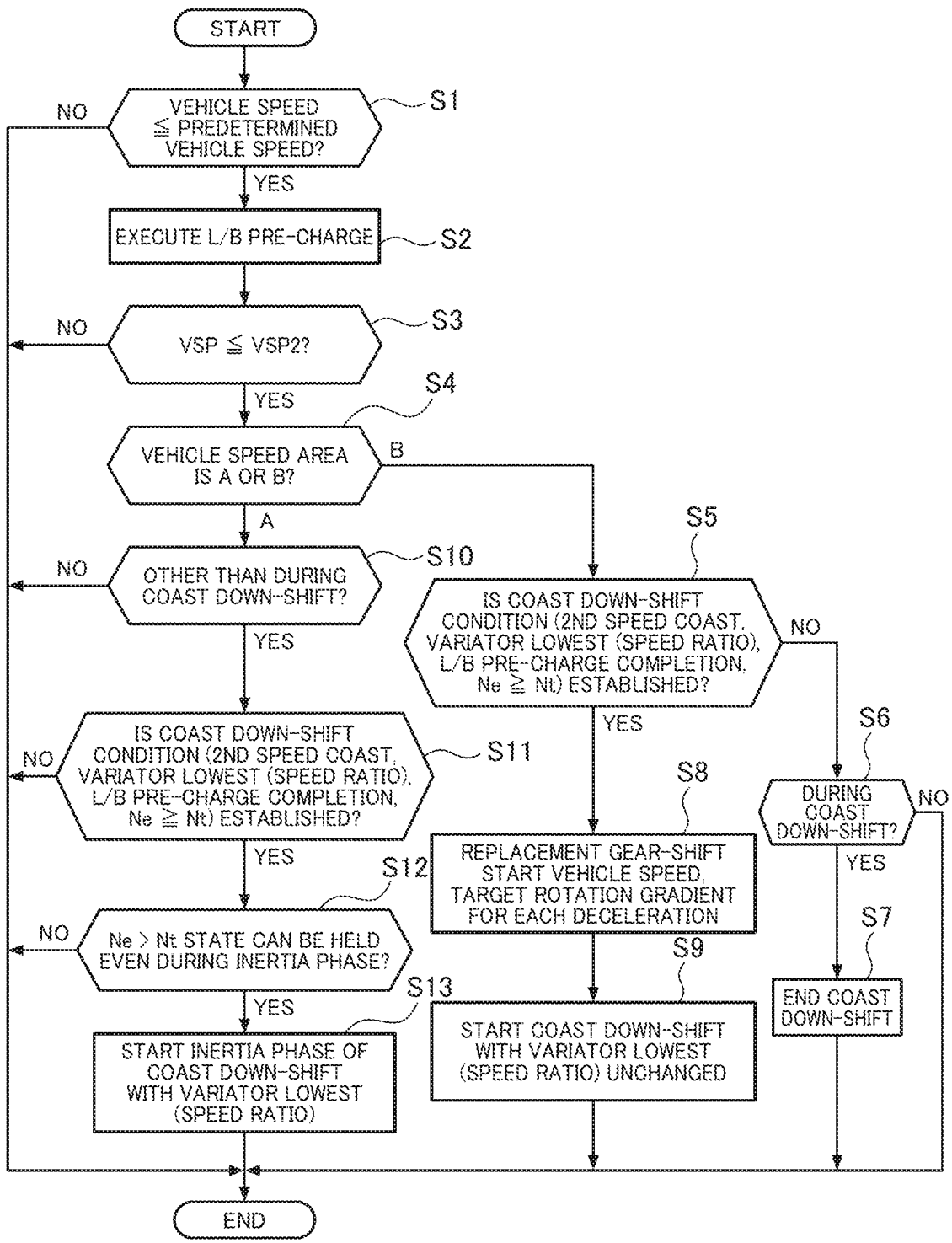
FIG. 4 is a flowchart representing a flow of a coast down-shift control process which is a 2-1 speed gear-shift during a coast deceleration executed by the transmission controller in the first preferred embodiment.

FIG. 4 is a flowchart representing a flow of a coast down-shift control process which is a 2nd-speed-to-1st-speed gear-shift during a coast deceleration to be executed by transmission controller 12 in the first embodiment. Each step of FIG. 4 representing the coast down-shift control process structure in the first embodiment which is positioned as an exception of the "synchronization control".

It should be noted that the flowchart of FIG. 4 is started when sub transmission 30 is in a selection state in which sub transmission 30 is at the second speed stage and the vehicle is in a coast deceleration state due to an accelerator pedal release and the process is repeated at a predetermined control period.

At a step S1, transmission controller 12 determines whether vehicle speed VSP is equal to or lower than a predetermined vehicle speed. If yes (VSP≤the predetermined vehicle speed), the routine goes to a step S2. If no (VSP>the predetermined vehicle speed) at step S1, the routine is ended. It should be noted that vehicle speed VSP is derived from an output rotation speed Nout of sub transmission 30 and gear ratios of a second gear train 5 and a final differential gear unit 6. It should also be noted that, with the vehicle speed information determined from sensor signals of the road wheel speed sensors input, the inputted vehicle speed information may be used as vehicle speed VSP. The predetermined vehicle speed is set as the vehicle speed starting a pre-charge to a low brake 32 engaged when sub transmission 30 is under the 2nd-speed-to-1st-speed gear-shift. In other words, the "predetermined vehicle speed" is set to, for example, about 20 km/h so that the pre-charge to low brake 32 with the time required for the pre-charge is accelerated from a second vehicle speed VSP2 (for example, about 15 Km/h) due to an intersecting point between a high-speed mode lowest line (2nd-L) and a coast line.

At step S2, transmission controller 12, subsequently to the determination that VSP≤the predetermined vehicle speed at step S1, executes the pre-charge to low brake 32 and the routine goes to a step S3. It should, herein, be noted that the pre-charge has the meaning such that a pre-charge pressure command which raises the hydraulic pressure in a stepwise manner only in a short time to low brake 32 is outputted, the pre-charge pressure which squeezes a return spring of low brake 32 is applied, and an interval between brake plates is held under a torque transmission immediate prior state.

At a step S3, transmission controller 12, subsequently to the determination of the pre-charge execution to low brake 32 at step S2, determines whether vehicle speed VSP is equal to or lower than second vehicle speed VSP2. If yes (VSP≤VSP2), the routine goes to a step S4. If no (VSP>VSP2), the routine is ended. It should, herein, be noted that second vehicle speed VSP2 is the vehicle speed (for example, about 15 km/h) provided according to an intersection point between high-speed mode lowest line (2nd-L) and the coast line.

At step S4, transmission controller 12, subsequently to the determination that the pre-charge at step S3 is completed, vehicle speed VSP at the present time is present in vehicle speed area A or in vehicle speed area B. If present in vehicle speed area B, the routine goes to a step S5. If the vehicle speed is present in vehicle speed area A, the routine goes to a step S11.

Figure 5:
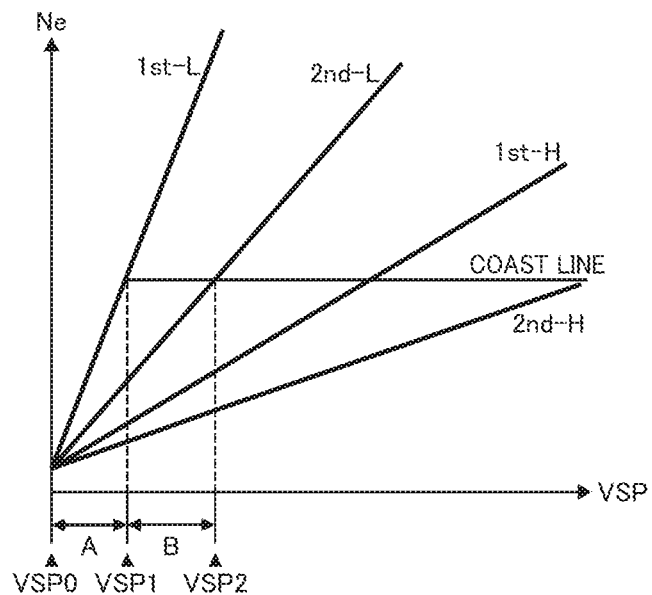
FIG. 5 is a gear-shift map view representing a vehicle speed area A and a vehicle speed area B used in the coast down-shift control process.

It should herein be noted that the gear-shift map shown in FIG. 5 is a map when a longitudinal axis of shift map shown in FIG. 5 is replaced from primary rotation speed Npri to engine rotation speed Ne, vehicle speed area A denotes the vehicle speed range in the shift map in FIG. 5 indicated by A and vehicle speed area B denotes the vehicle speed range in the shift map in FIG. 5. In details, vehicle speed area A is the vehicle speed range equal to or lower than a first vehicle speed range VSP1 (for example, about 10 km/h) corresponding to the intersection point between the high-speed mode lowest line (1-st line) and the coast line up to a zero vehicle speed VSP0 (VSP=0). The vehicle speed area B is the vehicle speed range from a second vehicle speed VSP2 (for example, about 15 km/h) corresponding to the intersection point between the high-speed mode lowest line (1st-L) and the coast line up to the first vehicle speed VSP1 corresponding to the intersection point between the low-speed mode lowest line (2nd-L) and the coast line. It should be noted that first vehicle speed VSP1 is included in vehicle speed area A.

At step S5, subsequently to the determination that vehicle speed VSP at step S4 is present in vehicle speed area B, transmission controller 12 determines whether the coast down-shift condition is established or not on a basis of the determination that vehicle speed VSP is present in vehicle speed area B. If yes at step S5 (the coast down-shift conditions are established), the routine goes to a step S8. If no (the coast down-shift conditions are not established), the routine goes to a step S6.

It should, herein, be noted that the coast down-shift conditions are established has the meaning that all of the conditions such that 2nd-speed coast condition, variator lowest condition, L/B pre-charge completion condition, and Ne≥Nt condition are established. Thus, when, from among the coast down-shift conditions, only a single condition is not established, transmission controller 12 determines that the coast down-shift conditions are not established.

The above-described 2nd-speed coast condition is determined to be established in a case where sub transmission 30 is during the coast deceleration at the 2nd-speed stage. It should be noted that the second-speed coast condition is such that when the gear-shift command outputted to sub transmission 30 is the second-speed stage command, accelerator opening angle APO is in an opening angle area in which the accelerator (pedal) is released, and the vehicle is traveling in a deceleration state such that the vehicle speed is reduced in accordance with a time passage.

Transmission controller 12 determines that the variator lowest condition is established in a case where the speed (gear) ratio of variator 20 is the lowest speed (gear) ratio. It should be noted that transmission controller 20 obtains the speed (gear) ratio of variator 20 by calculating the speed ratio thereof from primary rotation speed Npri of primary rotation speed sensor 46 and secondary rotation speed Nsec from secondary rotation speed sensor 42. Then, transmission controller 12 determines that the speed (gear) ratio of variator 20 is the lowest gear ratio by making coincidence with the speed (gear) ratio of variator 20 in an allowable error range with respect to the lowest gear ratio of variator 20.

"L/B pre-charge completion condition" is determined to be established when the vehicle is in the pre-charge to low brake 32 completion state, prior to the start of the coast down-shift. It should be noted that the pre-charge completion is determined that a passage time, for example, it takes from the start time of the L/B pre-charge has reached a time of addition of an output time of the pre-charge pressure command and a hydraulic pressure response delay time.

The above-described relationship of Ne≥Nt condition is determined to be established when, in second vehicle speed VSP2 entering vehicle speed area B, such a relationship that engine rotation speed Ne≥turbine rotation speed Nt is given. It should, herein, be noted that the "turbine rotation speed Nt" is obtained on a basis of the sensor signal from turbine rotation speed sensor 48 when vehicle speed VSP is in second vehicle speed VSP2.

At step S6, subsequently to the determination that the coast down-shift condition at step S5 is not established, transmission controller 12 determines whether the coast down-shift is being carried out according to the gear-shift of sub transmission 30 from the second speed stage to the first speed stage (hereinafter also called "2-1 speed gear-shift").

If yes (during the coast down-shift), the routine goes to a step S7. If no (other than the coast down-shift), the routine is ended.

At step S7, transmission controller 12, subsequently to the determination that the coast down-shift is being carried out at step S6, ends the coast down-shift according to the 2-1 speed gear-shift of sub transmission and the routine goes to end.

At step S8, transmission controller 12, subsequently to the determination that the coast down-shift condition is not established at step S5, determines the target rotation gradient for each of the clutch-to-clutch replacement gear-shift start vehicle speeds and the magnitude of deceleration and the routine goes to a step S9.

Figure 6:
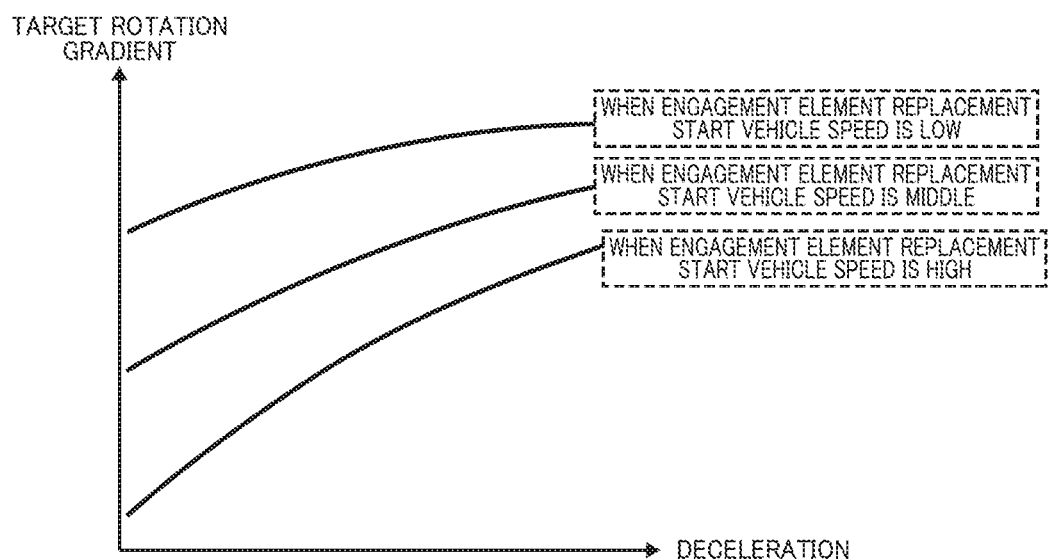
FIG. 6 is a map view of a target rotation gradient representing a target rotation gradient (=a gear shift speed) which accords with engagement element replacement gear shift vehicle speed and a magnitude of deceleration used in the coast down-shift control process.

It should, herein, be noted that the target rotation gradient map shown in FIG. 6 is a map on which a target rotation gradient characteristic which is a target value of a rise gradient of transmission input rotation speed (=turbine rotation speed Nt) raised according to the 2-1 speed gear-shift with the clutch-to-clutch (engagement element) gear-shift replacement start vehicle speeds and the magnitude of deceleration as parameters. This target rotation gradient map represents a gear-shift speed of the down-shift and transmission controller 12 makes the gear-shift speed slower than a pre-established gear-shift speed in a case where the down-shift occurs in vehicle speed area B in a case where the coast down-shift is started in vehicle speed area B in which turbine rotation speed Nt after the gear-shift is higher than engine rotation speed Ne (turbine rotation speed Nt≥engine rotation speed Ne). Then, the down-shift speed is set in accordance with the magnitudes of the engagement element replacement start vehicle speed and the deceleration so as to give a maximum gear-shift speed in a range in which the relationship of turbine rotation speed≥engine rotation speed Ne is established.

In other words, as shown in FIG. 6, the target rotation gradient (=gear-shift speed) makes the gear-shift speed slower when the deceleration is a moderate deceleration and, as the deceleration becomes more abrupt, the gear-shift speed is set to become quicker.

Then, when the clutch-to-clutch gear-shift replacement start vehicle speed becomes lower, the gear-shift speed is set to be quicker and, as the gear-shift replacement start vehicle speed becomes higher vehicle speed side, the gear-shift speed is set to become slower.

At step S9, transmission controller 12, subsequently to the determination that the target rotation gradient for each of clutch-to-clutch gear-shift replacement start vehicle speeds and the deceleration, starts the coast down-shift according to the gear-shift according to the 2-1 speed gear-shift of sub transmission 30 obtained from the target rotation gradient with the speed (gear) ratio of variator 20 maintained at the lowest speed (gear) ratio and the routine goes to the end.

It should, herein, be noted that the "coast down-shift" is carried out, with the hydraulic pressure command to low brake 32 in which the pre-charge has been completed raised and with the hydraulic pressure command to the high clutch 33 which has been engaged reduced, through the engagement element (clutch-to-clutch) gear-shift replacement such that low brake 32 which has been released is engaged and high clutch 33 which has engaged is released.

At a step S10, transmission controller 12, subsequently to the determination that vehicle speed VSP is present in vehicle speed area A, determines whether the present time is not in the coast down-shift according to the 2-1 speed gear-shift of sub transmission 30. If yes (other than during the coast down-shift), the routine goes to a step S11 and if no (during the coast down-shift) at step S10, the routine goes to the end.

At step S11, transmission controller 12, subsequently to the determination that the present time is the other time than during the coast down-shift at step S10, determines whether all of the coast down-shift conditions of sub transmission 30 are established. If yes (coast down-shift conditions are established), the routine goes to a step S12. If no (an un-establishment of the coast down-shift conditions) at step S12, the routine goes to the end. The establishment or un-establishment on the coast down-shift conditions at step S11 is the same as the determination thereon at step S5. It should, however, be noted that transmission controller 12 determines that the Ne≥Nt condition is established in a case where engine rotation speed Ne>turbine rotation speed Nt even during an inertia phase at first vehicle speed VSP1 entering vehicle speed area A.

At step S12, transmission controller 12, subsequently to the determination that the coast down-shift conditions at step S11 are established, determines whether the state in which the relationship of engine rotation speed Ne>turbine rotation speed Nt during the inertia phase is retainable (can be held) when the engagement element (clutch-to-clutch) gear-shift replacement at 2-1 speed gear-shift is carried out.

It should be noted that "engine rotation speed Ne" is obtained on a basis of the sensor signal from engine rotation speed sensor 47. Turbine rotation speed Nt is obtained on a basis of the senor signal from turbine rotation speed sensor 48. Then, when vehicle speed VSP is equal to or lower than vehicle speed area A, transmission controller 12 estimates a rising characteristic of turbine rotation speed Nt due to a transfer of the gear ratio to a lower gear ratio (speed ratio) side in the inertia phase. Transmission controller 12 estimates the rising characteristic of turbine rotation speed Nt due to the transition of the gear ratio (speed ratio) to the lower side in the inertia phase. It should be noted that the deceleration is obtained due to the differential calculation of vehicle speed VSP and the turbine rotational speed variation rate is obtained by the differential calculation of turbine rotation speed Nt.

At step S13, transmission controller 12 starts the inertia phase in the coast down-shift according to the 2-1 speed gear-shift of sub transmission 30 with the gear (speed) ratio of variator 20 maintained at the lowest gear ratio and the routine goes to the end.

It should, herein, be noted that, since the gear-shift speed in the case of the coast down-shift is a speed in the coast down-shift in vehicle speed area A in which turbine rotation speed Nt after the gear-shift is not higher than engine rotation speed Ne, this coast down-shift speed is deemed to be the pre-established gear-shift speed (>coast down-shift speed in vehicle speed area B).

Next, the action will be described below. At first, a description of the invention will be explained. Next, the action in the first embodiment will be explained dividing this action into "a coast down-shift control process action ", "a coast down-shift control action in vehicle speed area B", and "a characteristic action of the coast down shift control".

[A Description of the Invention]

Figure 7:
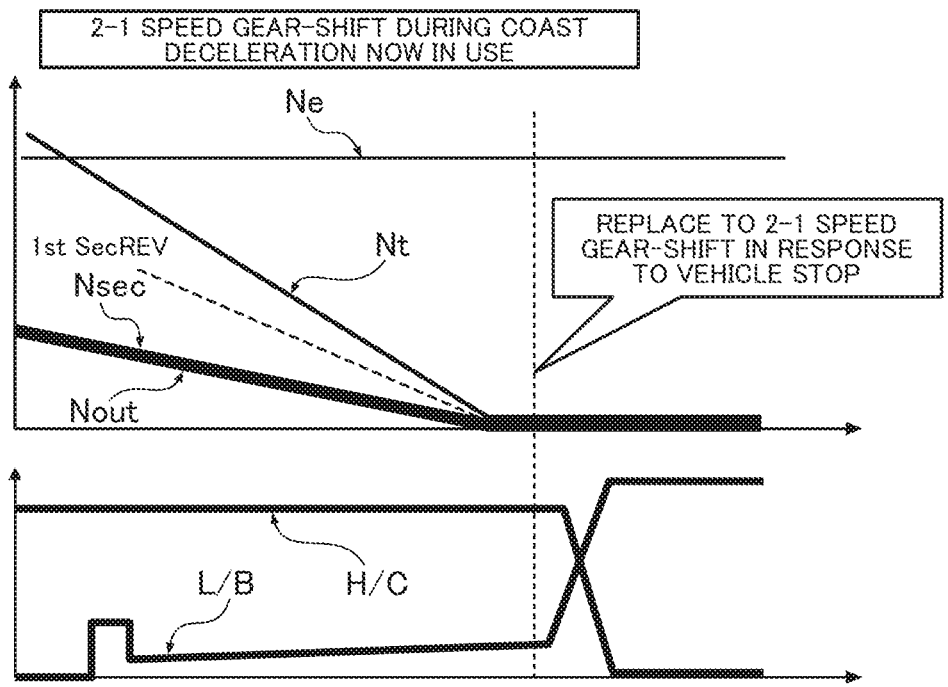
FIG. 7 is a timing chart representing each characteristic of an engine rotation speed Ne, a turbine rotation speed Nt, a secondary rotation speed Nsec, an output rotation speed Nout, an L/B clutch pressure command, and an H/C clutch pressure command in the 2-1 speed gear-shift during the coast deceleration now in use.

The continuously variable transmission with the sub transmission, now in use, is such that the variator is in the low gear ratio state on a basis of the vehicle speed when the vehicle is stopped from the coast deceleration state. However, as shown in FIG. 7, the sub transmission performs the 2-1 speed gear-shift after the stop of the vehicle. This reason is that to avoid a shock from occurring during the clutchto-clutch gear shift replacement and to prevent the vehicle from being stopped at a higher speed (gear) ratio side of the variator.

It should, however, be noted that, since the sub transmission is forced to perform a 2-1 speed gear-shift after the vehicle is stopped, whole transmission 4 performs a kick-down shift after the accelerator pedal is depressed in a case of the accelerator depression in the coast deceleration. Hence, as compared with a case where the accelerator depression from the coast deceleration at the first-speed stage, it takes more time for a re-acceleration. Especially, from a re-acceleration moment immediately before the vehicle stop, a difference in time for the re-acceleration occurs since the re-acceleration occurs after the variator returns to the lowest gear (speed) ratio.

Figure 8:
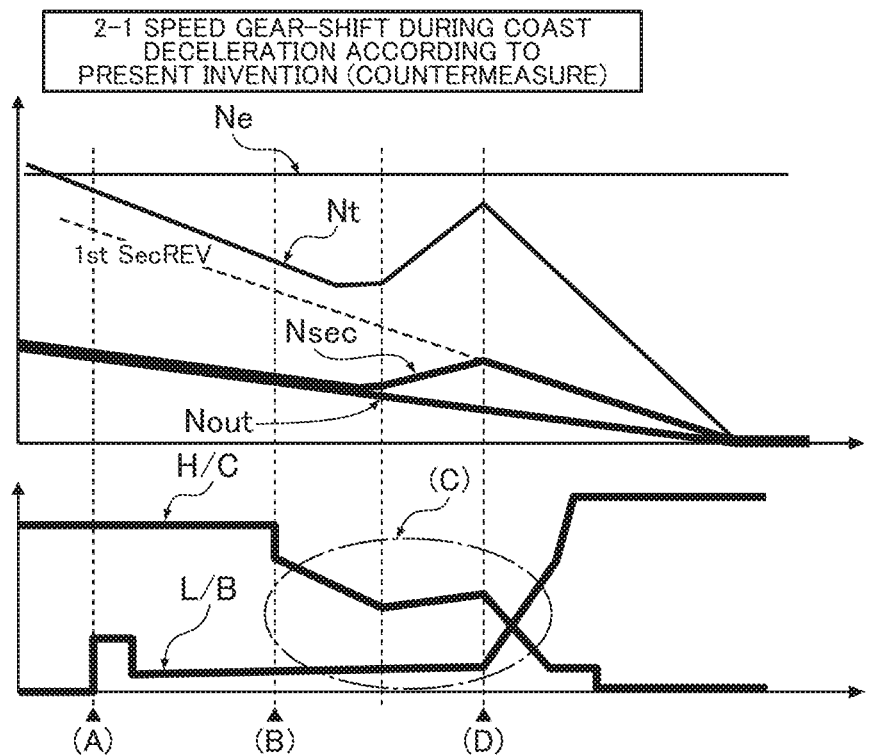
FIG. 8 is a timing chart representing each characteristic of engine rotation speed Ne, turbine rotation speed Nt, secondary rotation speed Nsec, output rotation speed Nout, L/B clutch pressure command, and H/C clutch pressure command in the 2-1 speed gear-shift during the coast deceleration in a case of the present invention (countermeasure).

Because of this, in order to improve the acceleration characteristic at a time of the acceleration during the accelerator depression time in the low vehicle speed area in the coast deceleration, as shown in FIG. 8, during the coast deceleration, such a control that the sub transmission is forced automatically to perform the 2-1 speed gear-shift is incorporated is the present invention. However, tasks when the 2-1 speed gear-shift during the coast deceleration is incorporated have the following four points:

That is, (A) a clutch-to-clutch gear shift replacement preparation timing;
(B) how the clutch-to clutch gear shift replacement start timing is determined; (C) a control procedure of the clutch pressure during the clutch-to-clutch gear shift replacement; and (D) a determination of one of the clutches which has been released is engaged.
Hereinafter, the respective tasks for items (A) through (D) will briefly be discussed below.

(A) Clutch-to-clutch gear-shift replacement preparation timing:
In order to control the low-brake (L/B) torque, it is necessary to squash a return spring before 2-1 speed gear-shift so that the low-brake is in a torque transmission immediately prior state before 2-1 speed gear-shift. A time is needed to squash the return spring. However, a time required to enable the squash is varied according to the magnitude of the deceleration. Since the magnitude of deceleration has a variation depending upon the brake manipulation of the driver, it is unpredictable and it is necessary to determine the timing of the clutch-to-clutch gear shift preparation timing.

(B) How the clutch-to-clutch gear shift replacement start timing is determined.
In the 2-1 speed gear-shift, the clutch-to-clutch gear shift replacement can be made in almost whole vehicle speed area. However, in order to prevent the occurrence of a shock, it is desirable to make the clutch-to-clutch gear shift replacement in a stable state. As the stable state, it is considered that a region in which the following conditions are always established, viz., engine rotation speed Ne>turbine rotation speed Nt at the lowest gear-shift ratio of the variator (the engine torque is applied to the forward (advance) traveling side). However, since turbine rotation speed Nt is raised when the 2-1 speed gear-shift is executed, it is necessary to discuss how a region such that engine rotation speed Ne>turbine rotation speed Nt should be determined. The reason is that, when the clutch-to-clutch gear shift replacement is limited to the region of engine rotation speed Ne>turbine rotation speed Nt, the vehicle speed of the clutch-to-clutch gear shift replacement start becomes low and the region in which the effect can be exhibited becomes narrow.

(C) The control method of the clutch pressure during the clutch-to-clutch gear shift replacement.
Since the automatic down-shift is carried out during the coast deceleration, the control without occurrence of the shock is demanded. However, it is difficult to carry out a shock-less clutch-to-clutch gear shift replacement depending upon a clutch deviation (variation). Especially, since, when a learning for the clutch-to-clutch gear shift replacement is not finished, it is difficult to carry out the clutch-to-clutch gear shift replacement without the shock, the discussion of the control method is needed.

(D) Engagement determination (whether one of the clutches which has been released is engaged). When the clutch-to-clutch gear shift replacement is carried out at a low vehicle speed, an accuracy of the rotation sensors is lowered at the low vehicle speed. Since the engagement of the corresponding clutch is basically determined according to forward and backward difference speed, a correct determination cannot be made in the state in which the accuracy of the rotation sensors is lowered.

The present invention is a solution of the above-described tasks (A) through (D). It is possible to enable the 2-1 speed gear-shift without shock according to the control in accordance with the situation. It should be noted that solution techniques on the tasks of (A) and (B) will be described later and the solution techniques on the tasks (C) and (D) will be described as follows:

(C) Control method of the clutch pressure during the clutch-to-clutch gear shift replacement.
1. Depending upon a progress status of the learning, the vehicle speed is varied.
Before the learning, the clutch-to-clutch gear shift replacement is carried out at a low vehicle speed to suppress a rotation step difference. As the learning is advanced, the clutch-to-clutch gear shift replacement is carried out at a high vehicle speed and a control for a large rotation step difference is carried out.
2. Depending upon the learning situation, the target rotation gradient is varied.
Before the learning, the target rotation gradient is suppressed to be low so that no output of the shock is carried out even if the variation of the target rotation gradient occurs. After the learning, the target rotation gradient is raised vertically and the clutch replacement is ended as early as possible and a clutch withstanding force is secured.

(D) Clutch-to-clutch gear shift engagement determination:
1. A lowest pressure condition of an engagement side clutch command pressure is provided for the engagement determination and the control is continued until the clutch engagement is assuredly carried out without failure
2. In a region in which the rotation control falls, the rotation gradient is suppressed to be lower to prevent an abrupt engagement (the engagement determination in terms of the rotation step difference is given up and the clutch engagement in an open control is carried out).
3. When the clutch command at an engagement side becomes equal to or more than the constant, a variation in the turbine rotation speed is observed when a release side clutch pressure is lowered in a state in which an engagement pressure is kept (remains unchanged).
In a case where no variation in the turbine rotation speed occurs even if the release side clutch pressure is lowered, the engagement of L/B is determined to be finished and a complete clutch engagement is carried out.

According to the present invention, when a clutch-to-clutch gear shift replacement start vehicle speed area is expanded and the coast down-shift is started in a vehicle speed area B, as a technique to give engine rotation speed Ne>turbine rotation speed Nt, an embodiment (a first embodiment) in which a gear-shift speed by sub transmission 30 is used. In the first embodiment, the target rotation gradient (=gear-shift speed) is switched according to the clutch replacement start vehicle speed and the deceleration. For example, when the deceleration is high, a speed at which a synchronous rotation drop is fast even when the vehicle speed is high. Hence, an early engagement with the target rotation gradient raised vertically is carried out. When the deceleration is low, the target rotation gradient is suppressed to be low and the clutch engagement is carried out so as not to occur an engine rotation racing.

According to the present invention, when the clutch-to-clutch gear shift replacement vehicle speed is expanded and the coast down-shift is carried out in vehicle speed area B, as a technique to give engine rotation speed Ne>turbine rotation speed Nt, an embodiment in which the continuously variable transmission according to variator 20 is a second embodiment. In the second embodiment, the up-shift of the variator is carried out by compensating for the rise in turbine rotation speed Nt according to the down-shift by sub transmission 30 so as to suppress the rise in turbine rotation speed Nt.

[Coast Down-shift Control Process Action]

Hereinafter, the coast down-shift control process action in the first embodiment will be explained on a basis of the flowchart shown in FIG. 4.

When sub transmission 30 is at the 2nd-speed stage and the coast deceleration caused by the release of the accelerator pedal (the foot separation from the accelerator pedal) is carried out, vehicle speed VSP is equal to or lower than a predetermined vehicle speed, in the flowchart of FIG. 4, the routine goes from step S1 to step S3 via step S2. Then, while transmission controller 12 determines at step S3 that vehicle speed VSP>second vehicle speed VSP2, the routine started from step S1 and ended at the end via step S1, step S2, and step S3 is repeated and pre-charge to low brake 32 is executed.

When transmission controller 12 determines that vehicle speed VSP is lowered up to second vehicle speed VSP2, the routine goes from step S3 to step S4. At step S4, transmission controller 12 determines whether vehicle speed VSP is present in vehicle speed area A or vehicle speed area B. If, at step S4, transmission controller 12 determines that vehicle speed VSP is present in vehicle speed area B, the routine goes from step S4 to step S5. If, at step S5, all coast down-shift conditions are established, the routine goes from step S5 to the end via step S8→step S9→the end. If no coast down-shift condition is established nor during the coast down-shift, the routine starting from step S5 and ended at the end via step S8 and step S9 is advanced. At step S8, the target rotation gradient for each of clutch-to-clutch gear shift replacement start vehicle speeds and for each magnitude of deceleration is determined. At the next step S9, the coast down-shift is started according to the 2-1 speed of sub transmission 30 which can obtain the determined target rotation gradient with the speed ratio of variator 20 maintained at the lowest speed (gear) ratio. Then, if, at step S5, transmission controller 12 determines that the coast down-shift condition is not established, the routine goes from step S5 and passed through step S7 via step S6. At step S7, the coast down-shift is ended.

Due to the reduction in vehicle speed VSP caused by the coast deceleration, vehicle speed VSP is present in vehicle speed area A at step S4 and transmission controller 12 determines that the present state is other than the coast down-shift. The routine goes from step S4 to step S11 via step S10. At step S11, transmission controller 12 determines whether the coast down-shift condition of sub transmission 30 is established. If the coast down-shift conditions are not established at step S11 and the present state is other than during the coast down-shift, the flow from step S11 to the end is repeated. If the coast down-shift conditions are established at step S11 to step S12. At step S12, transmission controller 12 determines whether engine rotation speed Ne>turbine rotation speed Nt can be held even during the inertia phase, when 2-1 speed gear-shift is executed. Then, if transmission controller 12 determines that the state of Ne>Nt cannot be held, the routine goes to step S13. At step S13, the coast down-shift with the 2-1 speed gear-shift of sub transmission 30 with the speed (gear) ratio of variator 20 maintained at lowest speed ratio (gear ratio) is carried out.

In this way, if the vehicle speed at which the coast down-shift is started falls in the vehicle speed areas A, B equal to or lower than second vehicle speed VSP2 due to an intersecting point between the high-speed mode lowest line (2nd-L) and the coast line and vehicle speed VSP reaches the predetermined vehicle speed before second vehicle speed VSP2, the pre-charge of low brake 32 is started (a solution technique of task (A)).

When the coast down-shift conditions are established with vehicle speed VSP fallen in vehicle speed area B, the coast down-shift of sub transmission 30 is started while variator 20 maintained at the lowest speed ratio while the state of Ne>Nt is held according to the gear-shift speed control. Furthermore, when the coast down-shift conditions are established when vehicle speed area A in such a scene as an abrupt acceleration or so forth, transmission controller 12 confirms that a state of Ne>Nt is held and the inertia phase in the coast down-shift of sub transmission 30 is started (the technique of task solution of (B)).

[Coast Down-shift Control Action in Vehicle Speed Area B]

Figure 9:
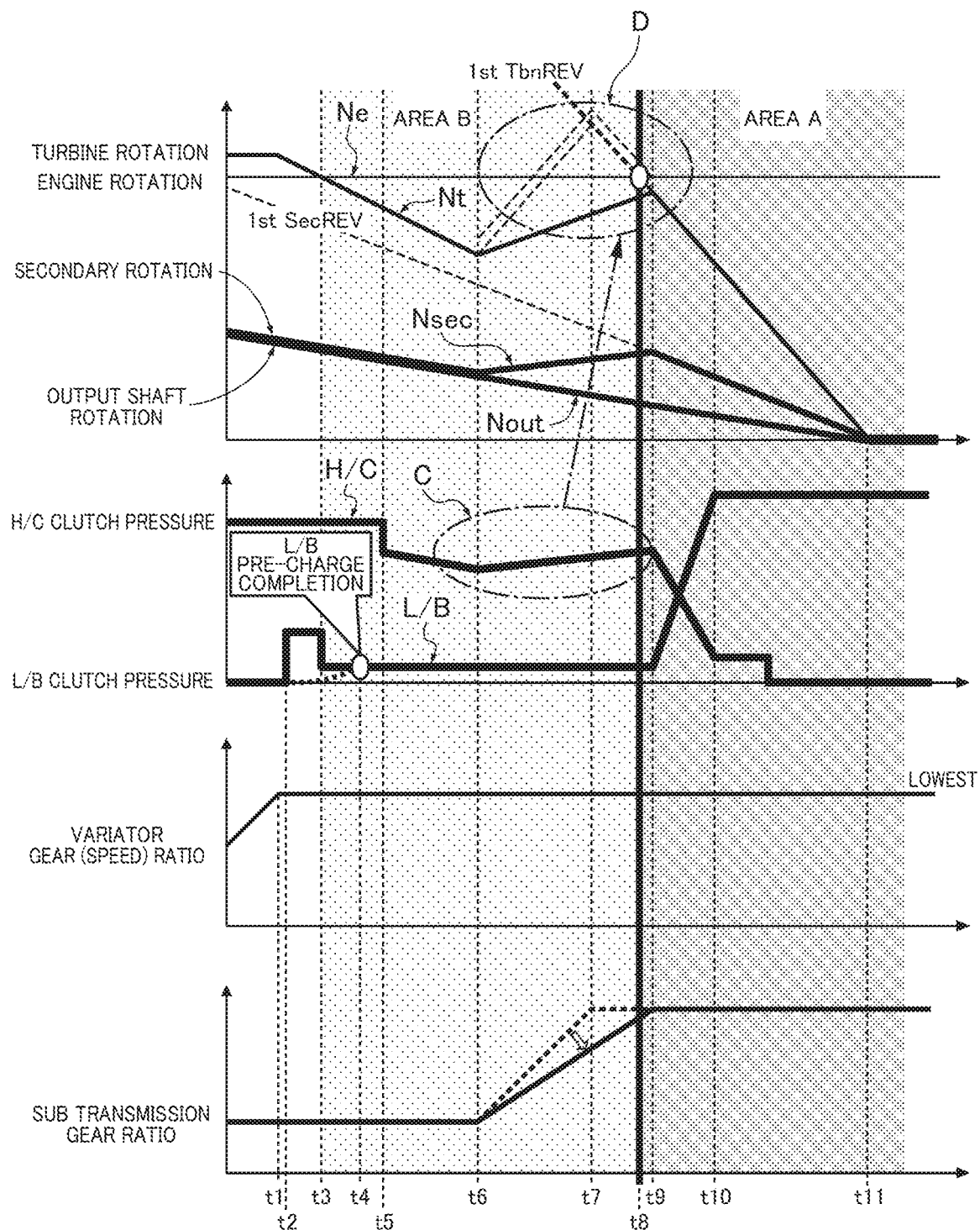
FIG. 9 is a timing chart representing each characteristic of engine rotation speed Ne, turbine rotation speed Nt, secondary rotation speed Nsec, output rotation speed Nout, L/B clutch pressure command, H/C clutch pressure command, a variator gear ratio (speed ratio), and a sub transmission gear ratio in the first preferred embodiment starting the 2-1 speed gear-shift for a vehicle speed VSP to enter a vehicle speed area B, in a moderate deceleration scene.

The coast down-shift control action in the first embodiment in which the coast down-shift is started after vehicle speed VSP enters vehicle speed area B in the moderate deceleration scene will be explained on a basis of a timing chart shown in FIG. 9. Hereinafter, supposing that the lock-up clutch is in the release state, the operation explanation of the coast down-shift control will be made.

At a step t1, variator gear ratio (=variator speed ratio) provides lowest gear ratio (=variator speed ratio) provides lowest gear-shift ratio). At a time t2, the L/B pre-charge is started. At a time t3, engine rotation speed Ne (=a constant rotation speed Ne (=a constant rotation speed in an idle rotation speed area)=turbine rotation speed Nt and vehicle speed VSP provides second vehicle speed VSP2 and enters vehicle speed area B. Thereafter, L/B pre-charge is completed at a time t4. At a time t5, the coast down-shift of sub transmission 30 is started when the coast down-shift condition is established.

At time t5, the relationship expressed as engine rotation speed Ne>turbine rotation speed Nt is established. At times t5 through t6, turbine rotation speed Nt is lowered as output speed Nout (=vehicle speed VSP) is lowered so that this difference in rotation speed between engine rotation speed Ne and turbine rotation speed Nt is expanded. If the gear-shift speed is a predetermined gear-shift speed, times t6 through t7 are the inertia phase time duration. At time t7, turbine rotation speed Nt is raised to push up engine rotation speed Ne. However, during the moderate deceleration, the gear-shift speed is made slower than the predetermined gear-shift speed. Thus, the inertia phase time duration becomes longer from time t6 and time t7 to the time t6 through time t9.

Accordingly, as shown in an inter-frame characteristic of arrow mark C, the H/C clutch pressure command becomes a moderate rise gradient and as shown in the inter-frame characteristic of arrow mark D, the rise gradient of turbine rotation speed Nt becomes moderate. Without push-up of engine rotation speed Ne, the relationship such that engine rotation speed Ne>turbine rotation speed Nt is maintained.

It should, herein, be noted that time t8 is a time at which vehicle speed VSP provides first vehicle speed VSP1 and enters vehicle speed area A. A time t10 is an end time at which the coast down-shift of sub transmission 30 is ended and a time t11 is a time at which the vehicle is stopped.

In this way, since the relationship of engine rotation speed Ne>turbine rotation speed Nt is maintained in the area enclosed by an arrow mark D is held, the transmission direction of the dynamic power is not reversed and the variation of the acceleration/deceleration before and after the down-shift is suppressed so that an un-match (unpleasant) feeling is not given to the driver. In addition, the time duration (times t5 through t10) during which the coast down-shift which matches with the moderate deceleration is taken. The coast down-shift can be ended at time t10 before time t11 at which the vehicle is stopped.

Figure 10:
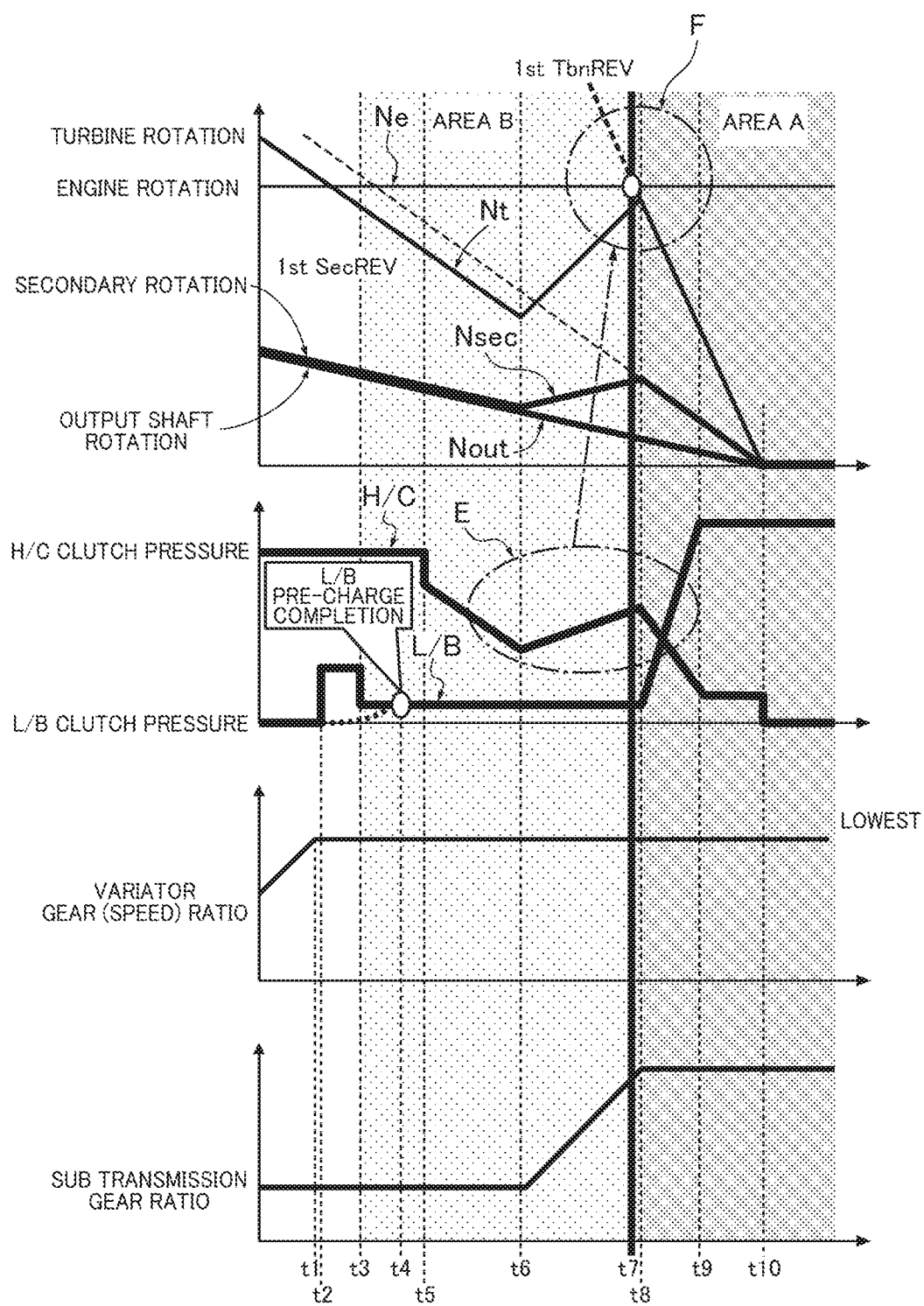
FIG. 10 is a timing chart representing each characteristic of engine rotation speed Ne, turbine rotation speed Nt, secondary rotation speed Nsec, output rotation speed Nout, L/B clutch pressure command, H/C clutch pressure command, a variator gear ratio (speed ratio), and a sub transmission gear ratio in the first preferred embodiment starting the 2-1 speed gear-shift for vehicle speed VSP to enter vehicle speed area B, in an abrupt deceleration scene.

Next, the coast down-shift control action at the first embodiment at which the coast down-shift is started in the first embodiment (embodiment 1) after vehicle speed VSP enters vehicle speed area B will be described on a basis of the timing chart shown in FIG. 10.

At time t1, variator gear (speed) ratio provides the lowest gear (speed) ratio, at time 2, L/B pre-charge is started, at time t3 at which engine rotation speed Ne>turbine rotation speed Nt, vehicle speed VSP enters vehicle speed area B with vehicle speed VSP providing second vehicle speed VSP2. Thereafter, at time t4, L/B pre-charge is completed. When the coast down-shift condition is established, the coast down-shift of sub transmission 30 is started from time t5.

At time t5, the relationship such that engine rotation speed Ne>turbine rotation speed Nt is present and, during the time duration from time t5 to time t6 turbine rotation speed Nt, turbine rotation speed Nt is decreased in accordance with the reduction of output rotation speed Nout (=vehicle speed VSP). Then, the difference rotation speed between engine rotation speed Ne and turbine rotation speed is sufficiently expanded. It should be noted that, since the gear-shift speed is the predetermined vehicle speed, the inertia phase time from time t6 becomes long and the end of the coast down-shift becomes delayed. However, since the abrupt deceleration is being carried out, the gear-shift speed is made to the speed near to a predetermined gear-shift speed level (since the gear-shift speed in the abrupt deceleration scene is made fast as compared to the gear-shift speed in the moderate acceleration) the inertia phase time provides a short time duration from time t6 to time t8. Accordingly, as shown in an inter-frame characteristic of arrow mark E, a H/C clutch pressure command is raised at an abrupt (steep) gradient but the relationship of engine rotation speed Ne. Turbine rotation speed Nt is held until time t8 at which the inertia phase is ended.

It should, herein, be noted that time t7 is the time at which vehicle speed VSP provides first vehicle speed VSP1 and enters vehicle speed area of A, a time t9 is the end time at which the coast down-shift of sub transmission 30 is ended, and time t10 is the time at which the vehicle is stopped.

In this way, since the relationship such that engine rotation speed Ne>turbine rotation speed Nt is established in the region enclosed by an arrow mark F, the transmission direction of the dynamic power is not reversed, the variation of the acceleration/deceleration is suppressed before and after the down-shift, and the un-match (unpleasant) feeling is not given to the vehicle driver.

In addition, the coast down-shift time duration (time t1 through time t9) which meets the abrupt deceleration is resulted and the coast down-shift at time t9 before time t10 at which the vehicle is stopped can be terminated.

[Coast Down-Shift Control Action In Vehicle Speed Area A]

Figure 11:
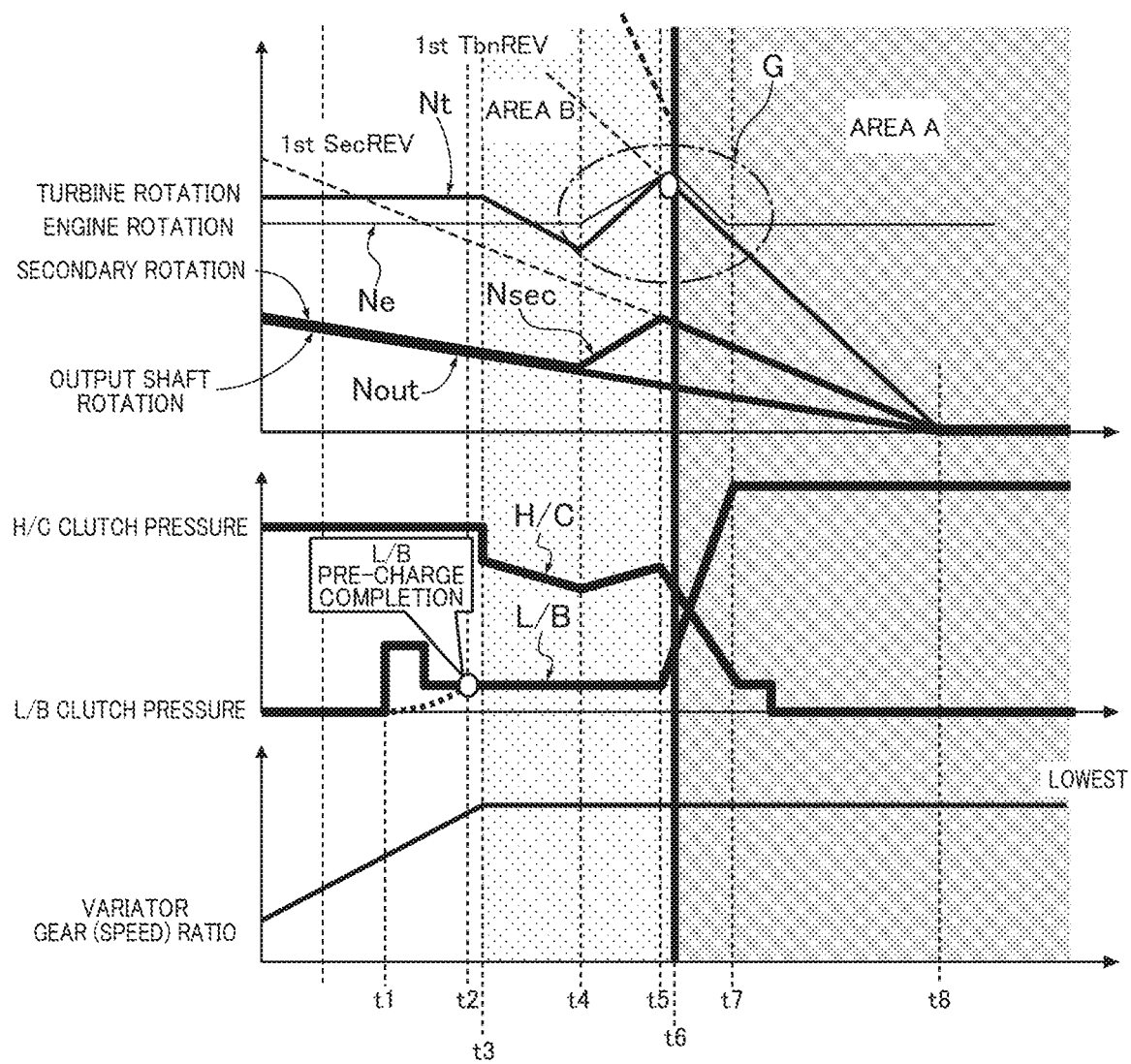
FIG. 11 is a timing chart representing each characteristic of engine rotation speed Ne, turbine rotation speed Nt, secondary rotation speed Nsec, output rotation speed Nout, L/B clutch pressure command, H/C clutch pressure command, and the variator gear ratio (speed ratio) in the first preferred embodiment starting the 2-1 speed gear-shift for vehicle speed VSP to enter vehicle speed area B, in an abrupt deceleration scene.

First, the coast down-shift control action in a comparative example in which the coast down-shift is started when vehicle speed VSP enters vehicle speed area B will be explained on a basis of a timing chart shown in FIG. 11. The operation explanation will be made with the lock-up clutch released.

In the comparative example, the L/B pre-charge is started at time t1. At time t2, L/B pre-charge is completed. The variator gear (speed) ratio which has the relationship of turbine rotation speed Nt>engine rotation speed Ne provides the lowest gear (speed) ratio at time t3. When vehicle speed VSP gives second vehicle speed VSP2 entering vehicle speed area B so that the coast down-shift of sub transmission 30 is started from time t3.

At time t3, the relationship of turbine rotation speed Nt>engine rotation speed Ne is present. At time duration t3 through time duration t4, turbine rotation speed Nt is reduced in accordance with the reduction in output rotation speed Nout (=vehicle speed VSP). At time t4, the relationship of engine rotation speed Ne>turbine rotation speed Nt is established. However, the difference rotation speed between engine rotation speed Ne>turbine rotation speed Nt is small. At the inertia phase of time duration of time t4 through t5, turbine rotation speed Nt is raised, engine rotation speed Ne is pushed up so that the relationship of turbine rotation speed Nt>engine rotation speed Ne is given. Thereafter, vehicle speed VSP enters area A when vehicle speed VSP gives first vehicle speed VSP1 and enters vehicle speed area of A. At this time, the coast down-shift of sub transmission 30 is ended at time t7 and the vehicle is stopped at time t8.

In this way, in the region enclosed by an arrow mark G, the relationship of turbine rotation speed Nt>engine rotation speed Ne is reversed to turbine rotation speed Nt>engine rotation speed Ne. In this way, when the rotational speed relationship is reversed, the transmission direction of the dynamic power is reversed and the acceleration/deceleration is varied before and after the down-shift and this gives the un-matched (unpleasant) feeling to the driver.

Figure 12:
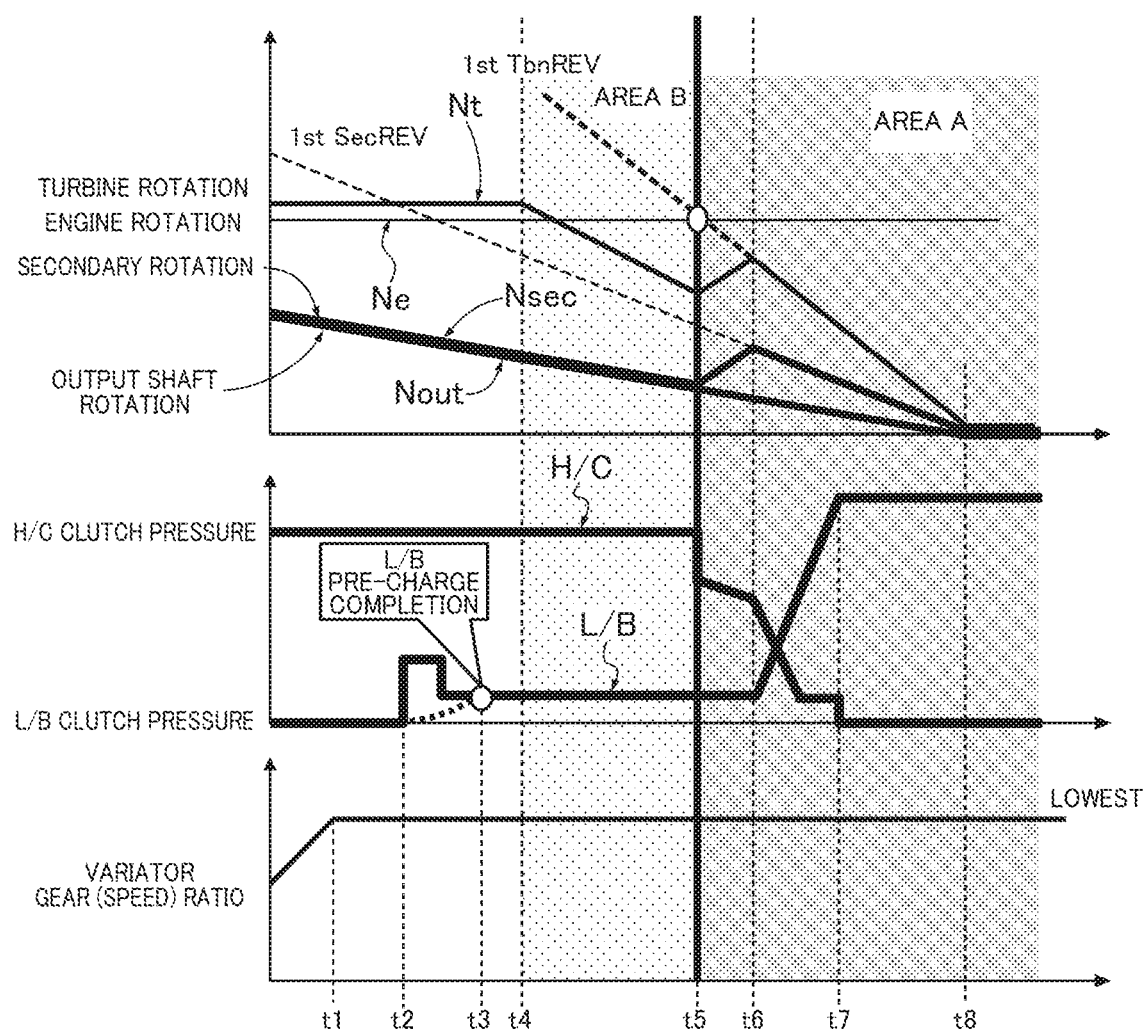
FIG. 12 is a timing chart representing each characteristic of engine rotation speed Ne, turbine rotation speed Nt, secondary rotation speed Nsec, output rotation speed Nout, L/B clutch pressure command, H/C clutch pressure command, and the variator gear ratio (speed ratio) in the first preferred embodiment starting an inertia phase of the 2-1 speed gear-shift, when vehicle speed VSP enters vehicle speed area A.

Next, the coast down-shift control action in the first embodiment in which the coast down-shift control action which starts the inertia phase when vehicle speed VSP falls in vehicle speed area A will be explained on a basis of the timing chart shown in FIG. 12. Then, the operation explanation will be made supposing that the lock-up clutch is in the released state.

In the first embodiment, variator gear (speed) ratio provides the lowest gear (speed) ratio at time t1, the L/B pre-charge at time t2 is started, and L/B pre-charge is completed at time t3, and vehicle speed VSP provides second vehicle speed VSP2 entering vehicle speed area B at time t4 at which turbine rotation speed Nt>engine rotation speed Ne. In this case, since the condition such that Ne≧Nt is not established, the coast down-shift is not started at area B. In this case, since the condition such that Ne≥Nt is not established from among the coast down-shift conditions, the coast down-shift is not started in the area B.

Then, turbine rotation speed Nt is reduced in accordance with the reduction of output rotation speed Nout (=vehicle speed) from time t4 and the relationship such that engine rotation speed Ne>turbine rotation speed Nt is established, vehicle speed VSP gives first vehicle speed VSP1 at time t5, and, then, vehicle speed VSP enters area B. In this case, the inertia phase is started in the coast down-shift according to the predetermined gear-shift speed. Thus, turbine rotation speed Nt is raised from time t7. However, during the inertia phase to time t6, the relationship of turbine rotation speed Nt>engine rotation speed Ne is held. Thereafter, the coast down-shift of sub transmission 30 is ended at time t7 and the vehicle is stopped at time t8.

In this way, if turbine rotation speed Nt>engine rotation speed Ne at second vehicle speed VSP2 at which vehicle speed VSP enters area B, the inertia phase at the coast down-shift at first vehicle speed VSP1 at which vehicle speed VSP enters area A is started. Thus, the relationship of engine rotation speed Ne>turbine rotation speed Nt is held. Thereafter, without reverse of the transmission direction of the dynamic power, the variation of the acceleration/deceleration after and before the down-shift is suppressed and the un-match (unpleasant) feeling is not given to the driver. In addition, the coast down-shift time which is short and which meets with the abrupt deceleration scene or so forth is given (time t5 through time t7). Then, the coast down-shift at time t7 before time t8 at which the vehicle is stopped can be ended.

[Characteristic Action of Coast Down-Shift Control]

In the first embodiment (embodiment 1), during the deceleration according to the 2nd speed stage of sub transmission, the variator 20 is kept to the lowest gear (speed) ratio. At this time, the down-shift at which sub transmission 20 is gear-shifted as 2-1 speed gear-shift is started with variator 20 maintained at the lowest gear (speed) ratio. Consequently, when the vehicle is started from the deceleration, a driving force response characteristic can be improved.

That is, in a case where, during the traveling of the vehicle, the sub transmission 30 in at the second speed state, the vehicle speed is reduced due to the deceleration and the gear (speed) ratio of variator 20 is at the lowest gear-shift (gear) ratio. In this case, when the vehicle is stopped, the 2-1 speed gear-shift is completed, and sub transmission 30 is in the first speed state. When the vehicle is started, the driving force corresponding to the first speed stage can be obtained. In addition, even if the 2-1 speed gear-shift is not completed when the vehicle is stopped, the time it takes to obtain the driving force becomes short and the driving force characteristic when the vehicle is started can be improved. At this time, since the gear (speed) ratio of variator 20 is kept at the lowest gear (speed) ratio, the reduction of the driving force at variator 20 is prevented.

In other words, when variator 20 is up-shifted through the synchronization gear shift when the 2-1 speed gear-shift of sub transmission 30 is carried out, the driving force of variator 20 is reduced. Hence, the driving force of variator 20 is maintained at the lowest gear (speed) ratio.

In the first embodiment, in a vehicle speed area in which turbine rotation speed Nt after the down-shift is equal to or lower than engine rotation speed Ne, the down-shift in which sub transmission 30 is gear-shifted from the second speed stage to the first speed stage is carried out. In other words, the magnitude of the rotation speed after the 2-1 speed gear-shift is carried out is not in the vehicle speed area not giving the relationship of turbine rotation speed Nt>engine rotation speed Ne (for example, vehicle speed area A).

That is, with the gear (speed) ratio of variator 20 maintained at the lowest gear (speed) ratio, sub transmission 30 is down-shifted, turbine rotation speed Nt which is the input rotation speed of the whole transmission is increased. Before the down-shift, the magnitude relationship such that turbine rotation speed Nt≤engine rotation speed Ne before the down-shift is present but, after the down-shift, the relationship such that turbine rotation speed Nt>engine rotation speed Ne is established and the transmission direction of the dynamic power is reversed. Thus, the acceleration or deceleration after and before the down-shift is varied so that the un-match feeling (unpleasant feeling) is given to the driver. Therefore, the down-shift of sub transmission 30 is carried out in vehicle speed area A so that the acceleration or deceleration after and before the down-shift is prevented from being varied and the un-match (unpleasant) feeling is not given to the driver. In addition, when turbine rotation speed Nt is increased due to the down-shift, turbine rotation speed Nt becomes high as compared with the case where the down-shift is carried out in vehicle speed area B and there is a possibility that an excessive engine braking is resulted. On the contrary, since the 2-1 speed gear-shift of sub transmission 30 in vehicle speed area A is carried out, the excessive engine braking can be suppressed.

In the first embodiment, at the first speed stage (1st speed stage) of sub transmission 30 and in vehicle speed area A which is the lowest gear (speed) ratio of variator 20 and which provides equal to or lower than first vehicle speed VSP1 which corresponds to the lowest gear (speed) ratio of variator 20, the down-shift is carried out in which sub transmission 30 is gear-shifted from second speed stage to the first speed stage.

That is, sub transmission 30 is at the first speed stage and a vehicle speed area in which the relationship such that engine rotation speed Ne≥turbine rotation speed Nt is held up to the 2-1 speed gear shift is preset as vehicle speed area A until after the 2-1 speed gear-shift, the vehicle speed being equal to or lower than the first vehicle speed VSP1 which is the lowest (speed) ratio. Thus, it is not necessary to calculate the magnitude rotational difference between engine rotation speed Ne and turbine rotation speed Nt for each time. Consequently, in the vehicle speed area in which turbine rotation speed Nt is equal to or lower than engine rotational speed Ne, the down-shift in which sub transmission 30 is the 2-1 (speed) gear shift is carried out. Hence, even though the simple construction, as described above, the un-match (unpleasant) feeling which is given to the driver can be prevented and the action such that the excessive energy braking can be suppressed can be achieved.

In the first embodiment, when sub transmission 30 is the first speed stage and variator 20 provides the first vehicle speed VSP1 at which variator 20 provides the lowest gear (speed) ratio, the inertia phase in the down-shift in which sub transmission 30 is the 2-1 speed gear shift is started. Therefore, the 2-1 speed gear-shift is started at a rate as quickly as possible and the 2-1 speed gear-shift can be completed until the vehicle is stopped.

Consequently, a reversal of the rotation speed magnitude relationship between engine rotation speed Ne and turbine rotation speed Nt can be prevented and the response characteristic of the driving force at the time of the vehicle start can be improved maximally.

That is, during the deceleration of sub transmission 30 at the 2nd speed, the vehicle speed is decreased along the lowest gear ratio of the second speed stage. At this time, the speed (gear) ratio of variator 20 is at the lowest gear ratio and turbine rotation speed Nt which is the transmission input rotation speed is lowered than engine rotation speed Ne at the coast time (Nt<Ne) and turbine rotation speed Nt is reduced together with the reduction of the vehicle speed. However, since the lock-up clutch of torque converter 2 is in the released state, an engine stalling is not carried out. Thereafter, since the pre-charge to low brake L/B engaged at first vehicle speed stage VSP1 is started and the pre-charge to low brake L/B is completed until vehicle speed VSP provides first vehicle speed VSP1 at which the low vehicle speed mode lowest gear-shift line and the coast line are intersected with each other. Then, when vehicle speed VSP is first vehicle speed VSP1 at which low vehicle speed lowest gear-shift line is intersected with the coast line, the inertia phase at the 2-1 speed gear-shift of sub transmission 30 is started with variator 20 maintained at the lowest gear (speed) ratio. The transmission input rotation speed after the gear-shift (=turbine rotation speed Nt) is the rotation speed at the coast line. The magnitude relationship between turbine rotation speed Nt and engine rotation speed Ne is not changed. After the completion of the 2-1 speed gear-shift, the vehicle is decelerated along low speed mode lowest line and is stopped.

In such a scene as an abrupt deceleration, there is a case where the pre-charge is not completed at first vehicle speed VSP1 at which low speed mode lowest gear-shift line are intersected. In such a case as described above, there is a possibility that the 2-1 speed gear-shift is not completed until the vehicle is stopped. After the vehicle stop, the 2-1 speed gear-shift of sub transmission 30 during the deceleration is continued.

In the first embodiment, in a case where the 2-1 speed gear-shift of sub transmission 30 is carried out in vehicle speed area B in which turbine rotation speed Nt≥after the down-shift becomes higher than engine rotation speed Ne, the down-shift speed is made slower than down-shift (gear-shift) speed in other vehicle speed region (especially, vehicle speed area A) and the state of the relationship such that turbine rotation speed Nt engine rotation speed Ne is held.

That is, in a case where the down-shift of sub transmission 30 is started in vehicle speed area B at which the magnitude relationship of the rotation speed is reversed due to the 2-1 speed gear-shift, the 2-1 speed gear-shift is made slower and a rise gradient of turbine rotation speed Nt is suppressed. Hence, the un-match (unpleasant) feeling given to the driver can be reduced.

In the first embodiment, the down-shift (gear-shift) speed at which the 2-1 speed gear-shift of sub transmission 30 is performed is set to the gear-shift speed which provides a maximum vehicle speed area within the range of the establishment of the relationship such that turbine rotation speed Nt engine rotation speed Ne.

That is, since the 2-1 speed gear-shift is advanced as early as possible, the 2-1 speed gear-shift can be completed until the vehicle is stopped. In addition, the 2-1 speed gear-shift when the vehicle is stopped can be advanced in the extreme. Thus, the reversal of rotation speed magnitude relationship due to the 2-1 speed gear-shift can be prevented and the driving force response characteristic at the time of vehicle start can be improved maximally.

Next, an effect of the present invention will be described. The gear-shift control apparatus and the gear-shift control method for vehicular transmission 4 in the first embodiment 4 have the following effects listed below.

(1) A gear-shift control apparatus or a gear-shift control method for the vehicular transmission including: a variator 20 interposed between a traveling drive source (engine 1) and driving wheels 7, 7 and which is capable of modifying a speed ratio at an unlimited stage (continuously); a sub transmission 30 installed in series with variator 20 and which is capable of switching a plurality of gear-shift stages by the clutch-to-clutch gear shift replacement; and a gear-shift control section (transmission controller 12) configured to perform a gear ratio control for variator 20 and a gear shift stage control for sub transmission 30 (transmission controller 12), wherein the gear-shift control section (transmission controller 12) starts the down-shift in which the sub transmission is gear-shifted from the traveling gear-shift stage (2nd speed stage) to the other gear-shift stage (the first speed stage) whose gear ratio is larger than the traveling gear-shift stage, with variator 20 kept at the lowest gear (speed) ratio, in a state in which, during the deceleration of the vehicle through the traveling gear-shift stage (the second speed state) of sub transmission 30, variator 20 is at the lowest gear (speed) ratio. Therefore, when the vehicle is started from the deceleration state, the driving force response characteristic can be improved.

(2) The down-shift oriented stage (the other gear-shift stage) whose gear ratio is larger than the traveling gear-shift stage (2nd speed stage) is a vehicle starting gear-shift stage (the 1st speed (first speed) stage). Therefore, when the vehicle is started from the deceleration state, the driving force can be secured through the down-shift from the traveling gear-shift stage (2nd-speed stage) to the (vehicle) starting gear-shift stage (1st-speed stage).

(3) Gear-shift control section (transmission controller 12) carries out the down-shift in which sub transmission 30 is gear-shifted from the traveling gear-shift stage (2nd speed stage) to the gear-shift stage (1st-speed stage) in a vehicle speed area in which the transmission input rotational speed after the down-shift (turbine rotation speed Nt) becomes equal to or lower than rotational speed (engine rotation Ne) of the traveling purpose drive source. Therefore, in addition to the effect of (1) or (2), during the deceleration in which the down-shift of sub transmission 30 is executed, the un-match (unpleasant) feeling given to the driver can be prevented from occurring and the excessive engine braking can be suppressed.

(4) The gear-shift control section (transmission controller 12) carries out the down-shift in which sub transmission 30 is at the first speed stage whose gear ratio is larger than the traveling gear-shift stage (second speed stage) and the vehicle speed gives the vehicle speed (first vehicle speed VSP1) in which variator 20 provides the lowest gear-ratio), the down-shift which makes the gear-shift in sub transmission 30 from the traveling gear-shift stage to the gear-shift whose gear ratio is larger than the traveling gear-shift stage (second-speed stage) in the vehicle speed area A is carried out. Therefore, even though a simple structure in which the calculation of the magnitude relationship of the rotational speed between traveling (purpose) drive source after the down-shift (engine rotation speed Ne) operation and transmission input rotation speed (turbine rotation speed Nt) is not required, the effect of above-described item (3) can be achieved.

(5) The gear-shift control section (transmission controller 12) starts the inertia phase in the down-shift in which sub transmission 30 is gear-shifted from the traveling gear-shift stage (second speed stage) to the other gear-shift stage (first speed stage) whose gear ratio is larger than the traveling gear-shift stage (second-speed stage) is carried out when sub transmission 30 is shifted to the gear-shift stage (first speed stage) whose gear ratio is larger than the traveling gear-shift stage (second-speed stage) and the vehicle speed provides vehicle speed (VSP1) at which variator 20 provides the lowest gear (speed) ratio. Hence, in addition to the effects described in items (1) through (4), during the deceleration, the start vehicle speed in the inertia phase in the down-shift of sub transmission 30 provides a highest one of the vehicle speeds (first vehicle speed VSP1) at which the rotation speed magnitudes are not reversed, the driving force characteristic at the time of the vehicle start can be improved maximally.

(6) In a case where the gear-shift control section (transmission controller 12) carries out the down-shift in which sub transmission 30 is gear-shifted from the traveling gear-shift stage (the second-speed stage) to the gear-shift stage (the first-speed stage) whose gear ratio is larger than that of the traveling gear-shift stage (the second speed stage) in vehicle speed area B in which the transmission input rotation speed (turbine rotation speed Nt) after the down-shift becomes higher than the rotation speed (engine rotation speed Ne) of the traveling purpose drive source, the gear-shift control section (transmission controller 12) makes the down-shift (gear-shift) speed slower than the down-shift speed in the other vehicle speed area. Thus, in addition to the effects of (1) or (2), the down-shift start vehicle speed of sub transmission 30 can be expanded up to vehicle speed area B while a prevention of the un-match (unpleasant) feeling given to the driver and a suppression of excessive engine braking are achieved.

(7) The gear-shift control section (transmission controller 12) sets the down-shift speed (gear shift speed) in which sub transmission 30 is gear-shifted from the traveling gear-shift stage (second-speed stage) to the gear-shift stage (first speed stage) whose gear ratio is larger than that of the traveling gear-shift stage to the gear-shift speed which provides a maximum speed area within a range in which transmission input rotation speed (turbine rotation speed Nt) after the down-shift becomes equal to or lower than the rotation speed of the traveling purpose drive source (engine rotation speed Ne).

Thus, in addition to the effect of (6), when the down-shift start vehicle speed of sub transmission 30 falls in vehicle speed area B, the driving force response characteristic at the time of the vehicle start can be improved maximally.

Embodiment 2

The second embodiment is an embodiment in which an up-shift of variator 20 is used in place of the adjustment of the gear-shift speed in the first embodiment when the relationship such that Ne≥Nt is held by starting the 2-1 speed gear shift in vehicle speed area B.

First, the structure will be explained. The gear-shift control apparatus and the gear-shift control method in the second preferred embodiment are the application of the engine mounted vehicle in which the continuously variable transmission with the sub transmission mounted in the same way as the first embodiment. Hereinafter, "the coast down-shift control process mechanism "for vehicular transmission 4 in the second embodiment will be explained. It should be noted that, since the whole system configuration and the gear-shift control structure according to the gear-shift map shown in FIG. 1 through FIG. 3 will herein be omitted since they are the same as the first embodiment.

[Coast Down-Shift Control Process Structure]

Figure 13:
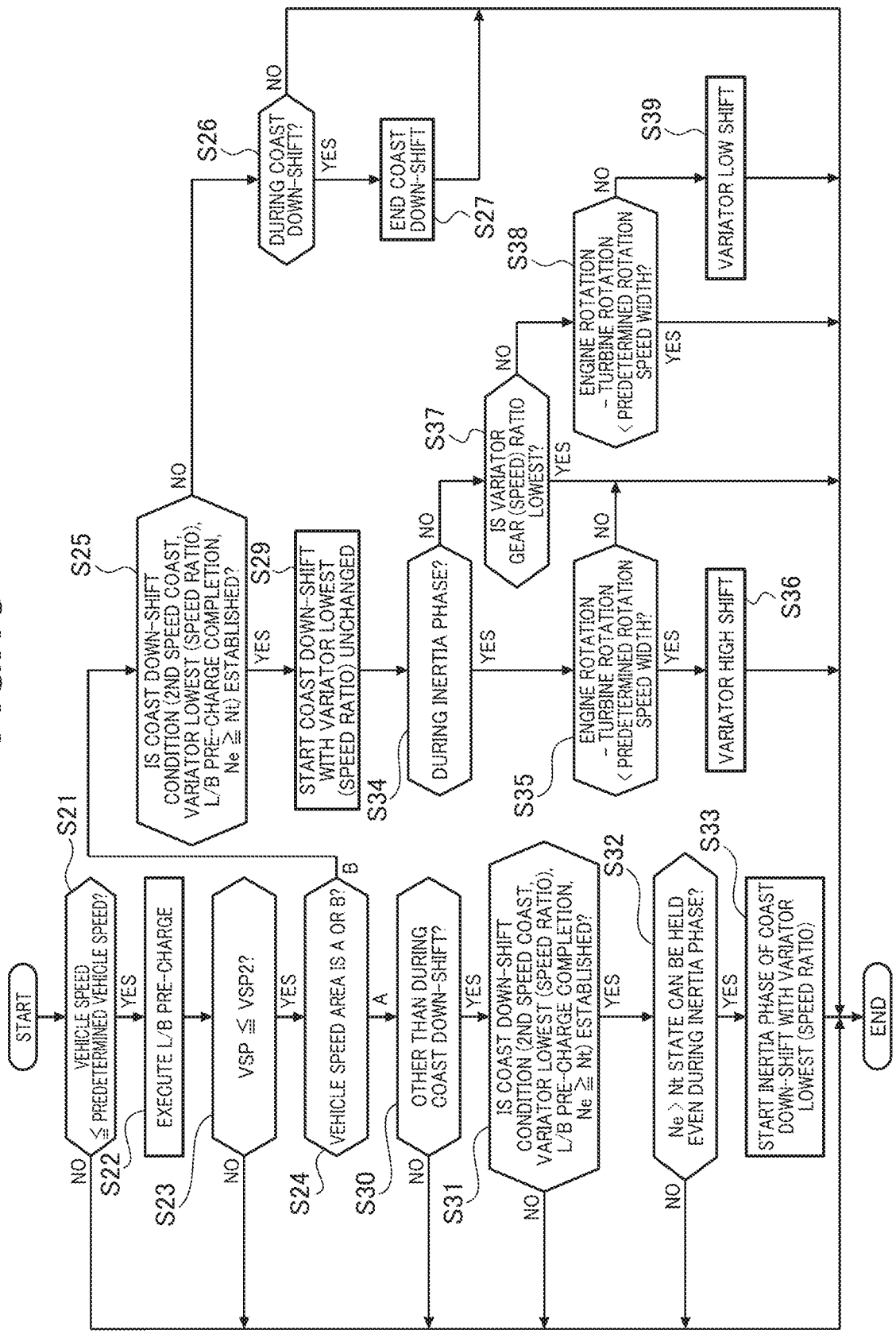
FIG. 13 is a flowchart representing a flow of the coast down-shift control process which is the 2-1 speed gear-shift executed by the transmission controller in a second preferred embodiment.

FIG. 13 is a flowchart representing a flow of the coast down-shift which corresponds to the 2-1 speed gear-shift during the deceleration of the coast deceleration executed in transmission controller 12 in the second embodiment. It should herein be noted that each of steps S1 through S33 shown in FIG. 4 corresponds to each of steps S1 through S7, steps S1 through S7, and steps S9 through S13 in the flowchart of FIG. 4 will herein be omitted.

Subsequently to step S29 at which the start of the coast down-shift is carried out with variator 20 maintained at the lowest gear (speed) ratio, at a step S34, transmission controller 12 determines whether a phase of the coast down-shift of sub transmission 30 is being in (during) the inertia phase. If Yes (during the inertia phase), the routine goes from a step S34 to a step S35. It should, herein, be noted that the phrase such that "during the inertia phase" means that transmission controller 12 determines that the present time is during the inertia phase (at step S34) from the calculation of sub transmission gear ratio from the input and output rotation speed difference and means that it is while the sub transmission gear ratio is being varied from the second speed gear ratio to the first speed gear ratio.

At step S35, subsequently from the determination that it is during the inertia phase at step S34, transmission controller 12 determines whether a rotation speed width (=rotation speed difference) between engine rotation speed Ne and turbine rotation speed Nt is narrower than a predetermined rotation speed width. If Yes (Ne−Nt<predetermined rotation speed width at step S35, the routine goes to a step S36. If No (Ne−Nt>predetermined rotation speed width, the routine goes to the end.

It should, herein, be noted that the predetermined rotation speed width is set to the rotation speed difference such as to provide a margin by which turbine rotation speed Nt does not exceed engine rotation speed Ne when variator 20 is up-shifted, with the up-shift (gear-shift) speed of variator 20 toward the high (rotation) speed ratio side taken into consideration.

In other words, the up-shift quantity of variator 20 is set to the shift quantity in a minimum (limit) area in the range in which turbine rotation speed Nt engine rotation speed Ne.

At step S36, subsequent to transmission controller 12 determination that Ne−Nt<predetermined rotation speed width at step S35, transmission controller 12 performs the up-shift of variator 20 toward the higher speed (gear) ratio side and the routine goes to the end.

At step S37, subsequently to the determination that the present time is the end of the inertia phase at step S34, transmission controller 12 determines whether the gear ratio (speed ratio) of variator 20 is at the lowest gear (speed) ratio. If Yes (lowest gear ratio) at step S35, the routine goes to the end. If No (other than the lowest gear ratio) at step S35, the routine goes to a step S38.

Subsequently to the determination that the gear ratio (speed ratio) of variator 20 is other than the lowest at step S37, transmission controller 12 determines whether the rotation speed width (rotation speed difference) between engine rotation speed Ne and turbine rotation speed difference Nt is narrower than the predetermined rotation speed width. If Yes at step S38 (Ne−Nt<predetermined rotation speed width), the routine goes to the end. If No (Ne−Nt≥predetermined rotation speed width) at step S38, the routine goes to a step S39. It should, herein, be noted that the predetermined rotation speed width at step S38 is the same value as that at step S35.

At step S39, after the determination of transmission controller 12 that Ne−Nt≥predetermined rotation speed width at step S38, variator 20 is in the down-shift toward the lowest gear (speed) ratio and the routine goes to the end.

Next, the action will be explained below. The explanation of the action in the second embodiment is divided into four sections of [Coast down-shift control process action], [Coast down-shift control action in vehicle speed area B], and [Characteristic action of coast down-shift control action].

[Coast Down-Shift Control Process Action]
Hereinafter, the coast down-shift control process action in the second embodiment will be explained on a basis of the flowchart shown in FIG. 13. It should be noted that the flow of the coast down-shift control process will be explained which is different from that of the first embodiment.

If the coast down-shift conditions at step S25 are established (Yes at step S25), the routine goes from step S25 to step S29. At step S29, with the gear ratio (speed ratio) of variator 20 kept at the lowest gear ratio (lowest speed ratio), the coast down-shift of sub transmission 30 is started. While, after the start of the coast down-shift, Ne–Nt≤predetermined rotation speed width although the entrance of the inertia phase, the routine goes from step S29→step S34→step S35 and the end. Thereafter, when turbine rotation speed Nt is raised and Ne–Nt<predetermined rotation speed width, the routine, in turn, goes from step S35→step S36→end. At step S36, variator 20 is up-shifted toward a higher gear ratio (a high speed ratio). In other words, during the inertia phase, variator 20 is up-shift controlled in order for turbine rotation speed Nt to be held in a lower state by the predetermined rotation speed width than engine rotation speed width.

Thereafter, when the inertia phase is ended, the routine goes from step S34 to step S39 via step S37 and step S38. At step S39, variator 20 is down-shifted toward the lowest gear (speed) ratio. In other words, after the inertia phase, variator 20 is down-shift controlled in order for variator 20 returned to the lowest gear (speed) ratio.

In this way, when vehicle speed VSP enters vehicle speed area B and the coast down-shift conditions are established, with variator 20 kept at the lowest gear (speed) ratio, the coast down-shift is started due to the 2-1 speed gear-shift of sub transmission 30. Then, during the inertia phase in the coast down-shift, the up-shift control of variator 20 is carried out so as to hold the state relationship such that Ne>Nt.

[Coast Down-shift Control Action in Vehicle Speed Area B]
The coast down-shift control action in the second embodiment in which the coast down-shift is started after the entrance of vehicle speed VSP into vehicle speed area B in a moderate acceleration scene will be explained on a basis of a timing chart shown in FIG. 14. Hereinafter, the explanation of operation supposing that the lock-up clutch is in the released state will be advanced.

At a time t1 in FIG. 14, the variator gear (speed) ratio is the lowest gear ratio. At a time t2 in FIG. 14, L/B pre-charge is started. At a time t3 in FIG. 14 at which engine rotation speed Ne=turbine rotation speed Nt, vehicle speed VSP becomes equal to second vehicle speed VSP2 and enters vehicle speed area B. Thereafter, at time t4 in FIG. 14, the L/B pre-charge is completed. At a time t5 in FIG. 14, when the coast down-shift conditions are established, the coast down-shift of sub transmission 30 is started from time t5 in FIG. 14.

At this time t5, transmission controller 12 determines whether the relationship such that engine rotation speed Ne>turbine rotation speed Nt is established At time duration from time t5 to time t6 in FIG. 14, turbine rotation speed Nt is decreased in accordance with the reduction in output rotation speed Nout (=vehicle speed VSP) so that the rotation speed difference between engine rotation speed Ne and turbine rotation speed Nt is expanded (enlarged). A time duration from time t6 through time t8 gives the inertia phase time. From time t6, turbine rotation speed Nt is raised. At a time t7, if Ne–Nt<predetermined rotation speed width, as denoted by an enclosure characteristic embraced with an arrow mark I, variator 20 starts the up-shift toward the higher gear (speed) ratio. During the time duration from time t7 to time t8, the rise of turbine rotation speed Nt is suppressed. Then, the up-shift of variator 20 to hold the rotation speed difference of (Ne–Nt) at the predetermined rotation speed width is continued. At time t8 at which the inertia phase is ended, the down-shift of variator 20 toward the lowest gear (speed) ratio is started so as to suppress the reduction of turbine rotation speed Nt. Then, at a time t9 in FIG. 14, vehicle speed VSP becomes equal to first vehicle speed VSP1 and enters the area of A, the down-shift of variator 20 is continued until a time t10 in FIG. 14 at which an immediately after (immediate prior) coast down-shift of sub transmission 30 is ended. That is, as denoted by the enclosure characteristic of an arrow mark J, during the inertia phase of time t6 to time t8, variator 20 is up-shifted so that, as shown by the enclosure characteristic of arrow mark J, the relationship such that engine rotation speed Ne>turbine rotation speed Nt is maintained while Ne–Nt=predetermined rotation speed width is held. It should be noted that a time t11 in FIG. 14 denotes a time at which the vehicle is stopped.

In this way, in the region enclosed by arrow mark J, the transmission direction of the dynamic power is not reversed, the variation of the acceleration/deceleration is suppressed after and before the down-shift, and no un-match (unpleasant) feeling is given to the driver since the relationship such that engine rotation speed Ne>turbine rotation speed Nt is held in the J arrow marked region. In addition, the coast down-shift time without delay in the gear-shift speed (time t5 through time t10) is resulted. The coast down-shift can be ended at time t10 before time t11 at which the vehicle is stopped.

[Coast Down-shift Control Characteristic Action]
In the second embodiment, in a case where, in vehicle speed area B in which turbine rotation speed Nt after the down-shift becomes higher than engine rotation speed Ne, sub transmission 30 is at the 2-1 speed gear-shift, variator 20 is up-shifted and the relationship such that turbine rotation speed Nt>engine rotation speed Ne is held.

That is, in a case where the down-shift of sub transmission 30 is started in vehicle speed area B in which the magnitude relationship of the rotation speeds due to the 2-1 speed gear-shift, variator 20 is up-shifted so that the increase in turbine rotation speed Nt is reduced. Hence, the un-match (unpleasant) feeling due to the reversal of the magnitude relationship of rotation speeds between turbine rotation speed Nt and engine rotation speed Ne can be reduced.

In the second embodiment, the gear-shift speed at which sub transmission 30 is gear-shifted (down-shifted) from the second speed stage to the first speed stage is set to the gear-shift speed which provides the maximum speed area within the range in which turbine rotation speed Nt≥engine rotation speed Ne That is, the 2-1 speed gear-shift can be completed until the vehicle stop by advancing the 2-1speed gear-shift as early as possible. Or, the 2-1 speed gear-shift at the time of the vehicle stop can, to the upmost, have been advanced. Thus, the reversal of the magnitude relationship of rotational speed due to the 2-1 speed gear-shift can be prevented and the driving force response characteristic at the time of the vehicle start can be improved maximally.

In the second embodiment, the up-shift quantity of variator 20 is set to the shift quantity in the minimum (limit) area within the range in which the relationship such that turbine rotation speed Nt≤engine rotation speed Ne is established. Thus, the magnitude relationship of rotation speeds during the 2-1 speed gear-shift is Ne≥Nt and (Ne−Nt) is held in the predetermined rotation speed width. This is because, if variator 20 is excessively up-shifted, the subsequent down-shift quantity toward the vehicle stop may become large so that there is a possibility that variator 20 cannot reach the lowest gear (speed) ratio until the vehicle stop. Thus, while the magnitude relationship such that Ne≥Nt is maintained, the up-shift quantity is set to the quantity by which (Ne−Nt) maintains the predetermined rotation speed width in order for the up-shift quantity of variator 20 held at a minimum limit (minimally).

Next, effects will be explained. The gear-shift control apparatus and gear-shift control method for vehicular transmission 4 in the second embodiment can achieve the following effects.

(8) The transmission control section (transmission controller 12) up-shifts variator 20 in order for the transmission input rotation speed (turbine rotation speed Nt) after the down-shift to become equal to or lower than the rotation speed of the traveling purpose drive source (engine rotation speed Ne) in a case where the down-shift in which sub transmission 30 gear-shifts (performs the gear-shift) from the traveling gear-shift stage (the second-speed stage) to the starting gear-shift stage (the first speed stage) in vehicle speed area B in which the transmission input rotation speed after the down-shift (turbine rotation speed Nt) is higher than the rotation speed (engine rotation speed Ne) of the traveling purpose drive source. Thus, while the up-shift of variator 20 can prevent the un-match (unpleasant) feeling given to the driver during the down-shift and can achieve the suppression of the excessive engine braking, the vehicle speed at which the down-shift of sub transmission 30 is started can be enlarged (expanded) to vehicle speed area B.

Hereinafter, the gear-shift control apparatus and the gear-shift control method for vehicular transmission 4 have been explained on a basis of the first embodiment (embodiment 1) and the second embodiment (embodiment 2). However, a specific structure is not limited to these embodiments. Unless a departure from a gist of the present invention related to respective claims in the scope of each of the claims, modification and/or addition of design can be allowed.

The first and second embodiments are examples of the application of the forward 2 stage and reverse 1 stage stepped transmission mechanism, as sub transmission 30. However, as the sub transmission, the present invention is not limited to forward 2 stage and reverse 1 stage step transmission mechanism but may be any one of other step transmission mechanisms whose gear-shift stages equal to or greater than three stages can be switched.

In the first and second embodiments, the example of 2-1 speed gear-shift in which the traveling gear-shift stage is the second speed stage and the gear-shift stage whose gear ratio is larger than the traveling gear-shift stage is the first speed stage which is the vehicle starting gear-shift stage. However, an example in which the traveling gear-shift stage is equal to or greater than the third speed stage and the gear-shift stage whose gear ratio is larger than the traveling gear-shift stage is the second gear-shift stage may be present. Furthermore, another example in which the traveling gear-shift stage is equal to or greater than the third speed stage and the gear-shift stage whose gear ratio is larger than the traveling gear-shift stage is the first gear-shift stage may be present.

In the first and second embodiments, as the traveling purpose drive source, the example of the engine mounted vehicle in which engine 1 is mounted has been described. However, as the traveling purpose drive source, an electric automotive vehicle in which an electric motor(s) is mounted as the traveling purpose drive source may be applied. In addition, as the traveling purpose drive source, a hybrid vehicle in which the engine and the motor are mounted as a plurality of the traveling purpose drive sources may be applied.

In the first and second embodiments, the example in which, during the deceleration, the coast down-shift according to the 2-1 speed gear-shift of the sub transmission is ended before the vehicle is stopped has been described. However, the present invention may be applied to a case where, during the deceleration, the coast down-shift according to the 2-1 speed gear-shift of the sub transmission may be started and the present invention is regardless of whether the 2-1 speed gear-shift is completed until the vehicle is stopped.

The invention claimed is:

1. A gear-shift control apparatus for a vehicular transmission, comprising:
   a variator intervened between a traveling purpose drive source and driving wheels and which is capable of modifying a gear ratio continuously;
   a sub transmission installed in series with the variator and which is capable of switching a plurality of gear-shift stages by performing a replacement gear shift such that, from among a plurality of engagement elements, one engagement element that has been engaged is released and another engagement element that has been released is engaged; and
   a gear-shift control section configured to perform a gear ratio control for the variator and a gear-shift stage control for the sub transmission,
   wherein the gear-shift control section starts a down-shift in which the sub transmission is gear-shifted from a traveling gear-shift stage to another gear-shift stage whose gear ratio is larger than that of the traveling gear-shift stage, with the variator maintained at a lowest gear ratio, in a state in which the variator is at the lowest gear ratio during a deceleration of the vehicle, with the sub transmission at the traveling gear-shift stage, and performs the down-shift in which the sub transmission is gear-shifted from the traveling gear-shift stage to the other gear-shift stage whose gear ratio is larger than that of the traveling gear-shift stage in a vehicle speed area in which a transmission input rotation speed after the down-shift becomes equal to or lower than an idling rotation speed of the traveling purpose drive source.

2. The gear-shift control apparatus for the vehicular transmission as claimed in claim 1, wherein the gear-shift control section performs the down-shift in which the gear-shift control section performs the down-shift in which the sub transmission is gear-shifted from the traveling gear-shift stage to the other gear-shift stage whose gear ratio is larger than that of the traveling gear-shift stage in a vehicle speed area in which the sub transmission is at the other gear-shift stage whose gear ratio is larger than the traveling gear-shift ratio and which is equal to or lower than a vehicle speed in which the variator is at a lowest gear ratio.

3. The gear-shift control apparatus for the vehicular transmission as claimed in claim 2, wherein the gear-shift control section starts an inertia phase in the down-shift in which the sub transmission is gear-shifted from the traveling gear-shift stage to the other gear-shift stage whose gear ratio is larger than that of the traveling gear-shift stage when the sub transmission is at the other gear-shift stage whose gear ratio is larger than the traveling gear-shift stage.

4. The gear-shift control apparatus for the vehicular transmission as claimed in claim 1, wherein the other gear-shift stage whose gear ratio is larger than that of the traveling gear-shift stage is a travel starting gear-shift stage.

5. A gear-shift control apparatus for a vehicular transmission, comprising:
a variator intervened between a traveling purpose drive source and driving wheels and which is capable of modifying a gear ratio continuously;
a sub transmission installed in series with the variator and which is capable of switching a plurality of gear-shift stages by performing a replacement gear shift such that, from among a plurality of engagement elements, one engagement element that has been engaged is released and another engagement element that has been released is engaged; and
a gear-shift control section configured to perform a gear ratio control for the variator and a gear-shift stage control for the sub transmission,
wherein the gear-shift control section starts a down-shift in which the sub transmission is gear-shifted from a traveling gear-shift stage to another gear-shift stage whose gear ratio is larger than that of the traveling gear-shift stage, with the variator maintained at a lowest gear ratio, in a state in which the variator is at the lowest gear ratio during a deceleration with the sub transmission at the traveling gear-shift stage and, in a case where the gear-shift control section performs the down-shift in which the sub transmission is gear-shifted from the traveling gear-shift stage to the other gear-shift stage whose gear ratio is larger than that of the traveling gear-shift stage in a vehicle speed area in which a transmission input rotation speed after the down-shift becomes higher than an idling rotation speed of the traveling purpose drive source, a gear-shift speed of the down-shift is made slower than the gear-shift speed of the down-shift in another vehicle speed area in order for the transmission input rotation speed to be equal to or lower than the idling rotation speed of the traveling purpose drive source.

6. The gear-shift control apparatus for the vehicular transmission as claimed in claim 5, wherein the gear-shift control section sets the gear-shift speed of the down-shift in which the sub transmission is gear-shifted from the traveling gear-shift stage to the other gear-shift stage whose gear ratio is larger than that of the traveling gear-shift ratio to another gear-shift speed which provides a maximum speed area within a range in which the transmission input rotation speed after the down-shift is equal to or lower than the idling rotation speed of the traveling purpose drive source.

7. A gear-shift control method for a vehicular transmission, comprising:
providing a variator intervened between a traveling purpose drive source and driving wheels and which is capable of modifying a gear ratio continuously;
providing a sub transmission installed in series with the variator and which is capable of switching a plurality of gear-shift stages by performing a replacement gear shift such that, from among a plurality of engagement elements, one engagement element that has been engaged is released and another engagement element that has been released is engaged; and
providing a gear-shift control section configured to perform a gear ratio control for the variator and a gear-shift stage control for the sub transmission,
wherein the gear-shift control section starts a down-shift in which the sub transmission is gear-shifted from a traveling gear-shift stage to another gear-shift stage whose gear ratio is larger than that of the traveling gear-shift stage, with the variator maintained at a lowest gear ratio, in a state in which the variator is at the lowest gear ratio during a deceleration with the sub transmission at the traveling gear-shift stage and performs the down-shift in which the sub transmission is gear-shifted from the traveling gear-shift stage to the other gear-shift stage whose gear ratio is larger than that of the traveling gear-shift stage in a vehicle speed area in which a transmission input rotation speed after the down-shift becomes equal to or lower than an idling rotation speed of the traveling purpose drive source.

8. A gear-shift control method for a vehicular transmission, comprising:
providing a variator intervened between a traveling purpose drive source and driving wheels and which is capable of modifying a gear ratio continuously;
providing a sub transmission installed in series with the variator and which is capable of switching a plurality of gear-shift stages by performing a replacement gear shift such that, from among a plurality of engagement elements, one engagement element that has been engaged is released and another engagement element that has been released is engaged; and
providing a gear-shift control section configured to perform a gear ratio control for the variator and a gear-shift stage control for the sub transmission,
wherein the gear-shift control section starts a down-shift in which the sub transmission is gear-shifted from a traveling gear-shifted stage to another gear-shift stage whose gear ratio is larger than that of the traveling gear-shift stage, with the variator maintained at a lowest gear ratio, in a state in which the variator is at the lowest gear ratio during a deceleration with the sub transmission at the traveling gear-shift stage and, in a case where the gear-shift control section performs the down-shift in which the sub transmission is gear-shifted from the traveling gear-shift stage to the other gear-shift stage whose gear ratio is larger than that of the traveling gear-shift stage in a vehicle speed area in which a transmission input rotation speed after the down-shift becomes higher than an idling rotation speed of the traveling purpose drive source, a gear-shift speed of the down-shift is made slower than the gear-shift speed of the down-shift in another vehicle speed area in order for the transmission input rotation speed to be equal to or lower than the idling rotation speed of the traveling purpose drive source.

* * * * *